US008692781B2

(12) United States Patent
Souchkov

(10) Patent No.: US 8,692,781 B2
(45) Date of Patent: *Apr. 8, 2014

(54) CAPACITIVE TOUCHSCREEN SYSTEM WITH MULTIPLEXERS

(75) Inventor: Vitali Souchkov, Walnut Creek, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 969 days.

This patent is subject to a terminal disclaimer.

(21) Appl. No.: 12/792,670

(22) Filed: Jun. 2, 2010

(65) Prior Publication Data

US 2011/0298744 A1    Dec. 8, 2011

(51) Int. Cl.
*G06F 3/041*   (2006.01)

(52) U.S. Cl.
USPC .......................................... 345/173

(58) Field of Classification Search
USPC ........................................... 345/156, 173–178
See application file for complete search history.

(56) References Cited

U.S. PATENT DOCUMENTS

| | | | | |
|---|---|---|---|---|
| 5,543,588 A * | 8/1996 | Bisset et al. | | 178/18.06 |
| 5,914,710 A * | 6/1999 | Chen et al. | | 345/179 |
| 6,249,606 B1 * | 6/2001 | Kiraly et al. | | 382/195 |
| 7,154,481 B2 | 12/2006 | Cross et al. | | |
| 2007/0109274 A1 * | 5/2007 | Reynolds | | 345/173 |
| 2008/0246496 A1 | 10/2008 | Hristov et al. | | |
| 2008/0278178 A1 | 11/2008 | Philipp | | |
| 2009/0273579 A1 * | 11/2009 | Zachut et al. | | 345/174 |
| 2009/0295754 A1 * | 12/2009 | Chen | | 345/175 |
| 2010/0026655 A1 | 2/2010 | Harley | | |
| 2010/0149110 A1 * | 6/2010 | Gray | | 345/173 |
| 2010/0309162 A1 * | 12/2010 | Nakanishi et al. | | 345/174 |
| 2011/0011717 A1 * | 1/2011 | Lin et al. | | 200/600 |

FOREIGN PATENT DOCUMENTS

WO    WO 2009/007704    1/2009

* cited by examiner

*Primary Examiner* — Chanh Nguyen
*Assistant Examiner* — Ram Mistry
(74) *Attorney, Agent, or Firm* — Winston Hsu; Scott Margo

(57) ABSTRACT

Disclosed herein are various embodiments of a capacitive touchscreen system that is capable of sensing simultaneous or near-simultaneous multiple finger touches made on a capacitive touchscreen. In one embodiment, drive and sense circuits operably connected to X and Y lines of the touchscreen may be interchangeably and selectably configured to drive and sense X and Y lines of the touchscreen, respectively, or drive and sense Y and X lines, respectively, of the touchscreen, through first and second multiplexers operating under the control of a drive/sense processor.

45 Claims, 12 Drawing Sheets

CAPACITIVE TOUCHSCREEN SYSTEM WITH MULTIPLEXERS

RELATED APPLICATION

This patent application incorporates by reference herein in its entirety U.S. patent application Ser. No. 12/792,682 filed Jun. 2, 2010, entitled "Capacitive Touchscreen System with Multiple Drive-Sense Circuits" to Vitali Souchkov.

FIELD OF THE INVENTION

Various embodiments of the invention described herein relate to the field of capacitive sensing input devices generally, and more specifically to multiple simultaneous or near-simultaneous touch mutual capacitance measurement or sensing systems, devices, components and methods finding particularly efficacious applications in touchscreens underlain by LCD displays or other types of image displays.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded, object is a finger. The human body is essentially a capacitor to a surface where the electric field vanishes, and typically has a capacitance of around 100 pF.

Electrodes in self-capacitance touchpads are typically arranged in rows and columns. By scanning first rows and then columns the locations of individual disturbances induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth Pattern. Such interleaving creates a larger region where a finger is sensed, by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example; U.S. Pat. No. 5,861,875 to Gerpheide entitled "Methods and Apparatus for Data Input" dated Jan. 19, 1999. Mutual capacitance technology is employed in touchpad devices manufactured by CIRQUE.™ In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of n×n intersections with only 2n pins on an IC.

It is well known that accurately simultaneously or near-simultaneously the locations of multiple finger touches on a capacitive touchscreen is difficult, and frequently unsuccessful.

What is needed is a capacitive measurement system that may be employed in touchscreen and touchpad applications that is capable of accurately, reliably and quickly distinguishing between multiple simultaneous or near-simultaneous touches on a capacitive touchscreen.

SUMMARY

In one embodiment, there is provided capacitive touchscreen system comprising a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or touch devices brought into proximity thereto, a first multiplexer operably connected to the first plurality of electrically conductive traces and to the second plurality of electrically conductive traces, a second multiplexer operably connected to the first plurality of electrically conductive traces and to the second plurality of electrically conductive traces, a plurality of sense circuits operably connected to the first multiplexer, one each of such sense circuits being operably and selectably connectable to a corresponding one of the first plurality of traces or second plurality of traces under the control of a drive/sense processor operably connected thereto, each sense circuit comprising a charge integrator circuit operably connected to a corresponding comparator, and a drive circuit operably connected to the second multiplexer and configured to drive at least some of the first plurality of traces or second plurality of traces therethrough, wherein the drive/sense processor operably is connected to the first and second multiplexers, the plurality of sense circuits and the drive circuit, the drive/sense processor being configured to control the operation of the plurality of sense circuits to sense at least some of the mutual capacitances through the first or second pluralities of traces, the sense circuits, and the first multiplexer, and to control the operation of the drive circuit to drive at least some of the first or second pluralities of traces through the second multiplexer, the drive circuit and the first and second multiplexers being controlled by the drive/sense processor such that when the mutual capacitances are being sensed by the sense circuits through the first plurality of traces the drive circuit is driving the second plurality of traces, and further, such that when the mutual capacitances are being sensed by the sense circuits through the second plurality of traces the drive circuit is driving the first plurality of traces.

In another embodiment, there is provided a capacitive touchscreen system comprising a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or touch devices brought into proximity thereto, a first multiplexer operably connected to the first plurality of electrically conductive traces, a second multiplexer operably connected to the second plurality of electrically conductive traces, a plurality of sense circuits operably connected to the first multiplexer and to the second multiplexer, one each of such sense circuits being operably and selectably connectable to a corresponding one of the first or second pluralities of traces under the control of a drive/sense processor operably connected thereto, each sense circuit comprising a charge integrator circuit operably connected to a corresponding comparator, and a drive circuit operably connected to the first and second multiplexers and configured to drive at least some of the first plurality of traces or second plurality of traces therethrough, wherein the drive/sense processor operably is connected to the first and second multiplexers, the plurality of sense circuits and the drive circuit, the drive/sense processor being configured to control the operation of the plurality of sense circuits to sense at least some of the mutual capacitances through the first or second pluralities of traces, the sense circuits, and the first or second multiplexers, and to control the operation of the drive circuit to drive at least some of the first or second pluralities of traces through the first or second multiplexers, the drive circuit and the first and second multiplexers being controlled by the drive/sense processor such that when the mutual capacitances are being sensed by, the sense circuits through the first plurality of traces the drive circuit is driving the second plurality of traces, and further such that when the mutual capacitances are being sensed by the sense circuits through the second plurality of traces the drive circuit is driving the first plurality of traces.

In a further embodiment, there is provided a method of detecting touches on a capacitive touchscreen system comprising a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or other touch devices brought into proximity thereto, a first multiplexer operably connected to the first plurality of electrically conductive traces and to the second plurality of electrically conductive traces, a second multiplexer operably connected to the first plurality of electrically conductive traces and to the second plurality of electrically conductive traces, a plurality of sense circuits operably connected to the first multiplexer, one each of such sense circuits being operably and selectably connectable to a corresponding one of the first plurality of traces or second plurality of traces under the control of a drive/sense processor operably connected thereto, each sense circuit comprising a charge integrator circuit operably connected to a corresponding comparator, and a drive circuit operably connected to the second multiplexer and configured to drive at least some of the first plurality of traces or second plurality of traces therethrough, wherein the drive/sense processor operably is connected to the first and second multiplexers, the plurality of sense circuits and the drive circuit, the drive/sense processor being configured to control the operation of the plurality of sense circuits to sense at least some of the mutual capacitances through the first or second pluralities of traces, the sense circuits, and the first multiplexer, and to control the operation of the drive circuit to drive at least some of the first or second pluralities of traces through the second multiplexer, the drive circuit and the first and second multiplexers being controlled by the drive/sense processor such that when the mutual capacitances are being sensed by the sense circuits through the first plurality of traces the drive circuit is driving the second plurality of traces, and further such that when the mutual capacitances are being sensed by the sense circuits through the second plurality of traces the drive circuit is driving the first plurality of traces, the method comprising: (a) driving the first plurality of electrically conductive traces through the drive circuit; (b) sensing the mutual capacitances through the second plurality of electrically conductive traces and the sense circuits; (c) driving the second plurality of electrically conductive traces through the drive circuit; (d) sensing the mutual capacitances through the first plurality of electrically conductive traces and the sense circuits, and (e) detecting the locations of one or more touches on the touchscreen on the basis of sensed mutual capacitances exceeding predetermined voltage thresholds.

In another embodiment, there is, provided a method: of detecting touches on a capacitive touchscreen system comprising a touchscreen comprising a first plurality of electrically conductive traces arranged in rows or columns, and a second plurality of electrically conductive traces arranged in rows of columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or touch devices brought into proximity thereto, a first multiplexer operably connected to the first plurality of electrically conductive traces, a second multiplexer operably connected to the second plurality of electrically conductive traces, a plurality of sense circuits operably connected to the first multiplexer and to the second multiplexer, one each of such sense circuits being operably and selectably connectable to a corresponding one of the first plurality of traces or second plurality of traces under the control of a drive/sense processor operably connected thereto, each sense circuit comprising a charge integrator circuit operably connected to a corresponding comparator, and a drive circuit operably connected to the first and second multiplexers and configured to drive at least some of the first plurality of traces or second plurality of traces through the first or second multiplexers, wherein the drive/sense processor operably is connected to the first and second multiplexers, the plurality of sense circuits and the drive circuit, the drive/sense processor being configured to control the operation of the plurality of sense circuits to sense at least some of the mutual capacitances through the first or second pluralities of traces, the sense circuits, and the first or second multiplexers, and to control the operation of the drive circuit to drive at least some of the first or second pluralities of traces through the first or second multiplexers, the drive circuit and the first and second multiplexers being controlled by the drive/sense processor such that when the mutual capacitances are being sensed by the sense circuits through the first plurality of traces the drive circuit is driving the second plurality of traces, and further such that when the mutual capacitances are being sensed by the sense circuits through the second plurality of traces the drive circuit is driving the first plurality of traces, the method comprising: (a) driving the first plurality of electrically conductive traces through the drive circuit; (b) sensing the mutual capacitances through the second plurality of electrically conductive traces and the sense circuits; (c) driving the second plurality of electrically conductive traces through the drive circuit; (d) sensing the mutual capacitances through the first plurality of electrically conductive traces and the sense circuits, and (e) detecting the locations of one or more touches on the touchscreen on the basis of sensed mutual capacitances exceeding predetermined voltage thresholds.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
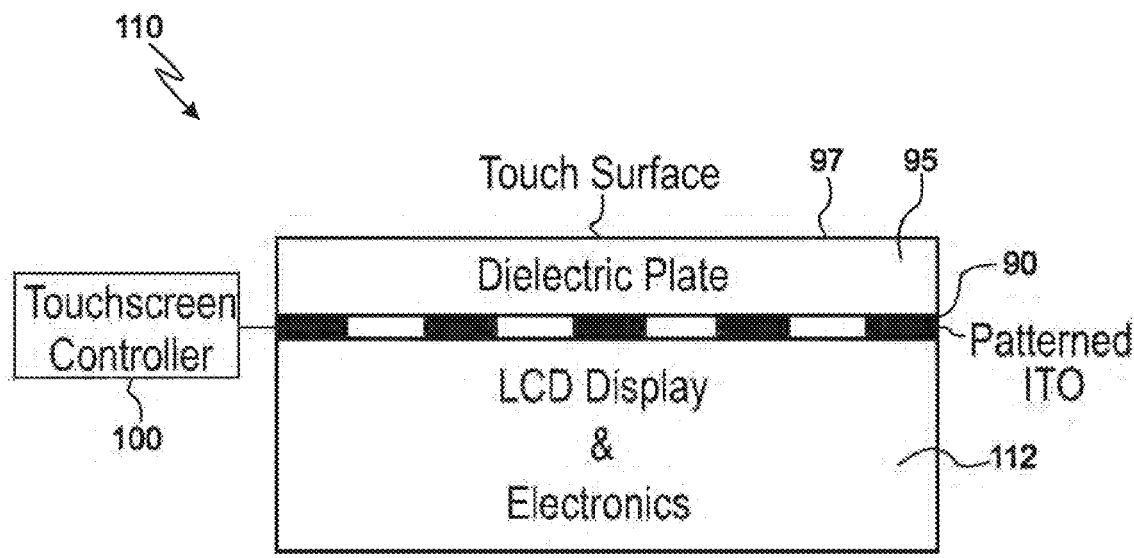
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath display 112.

Figure 2:
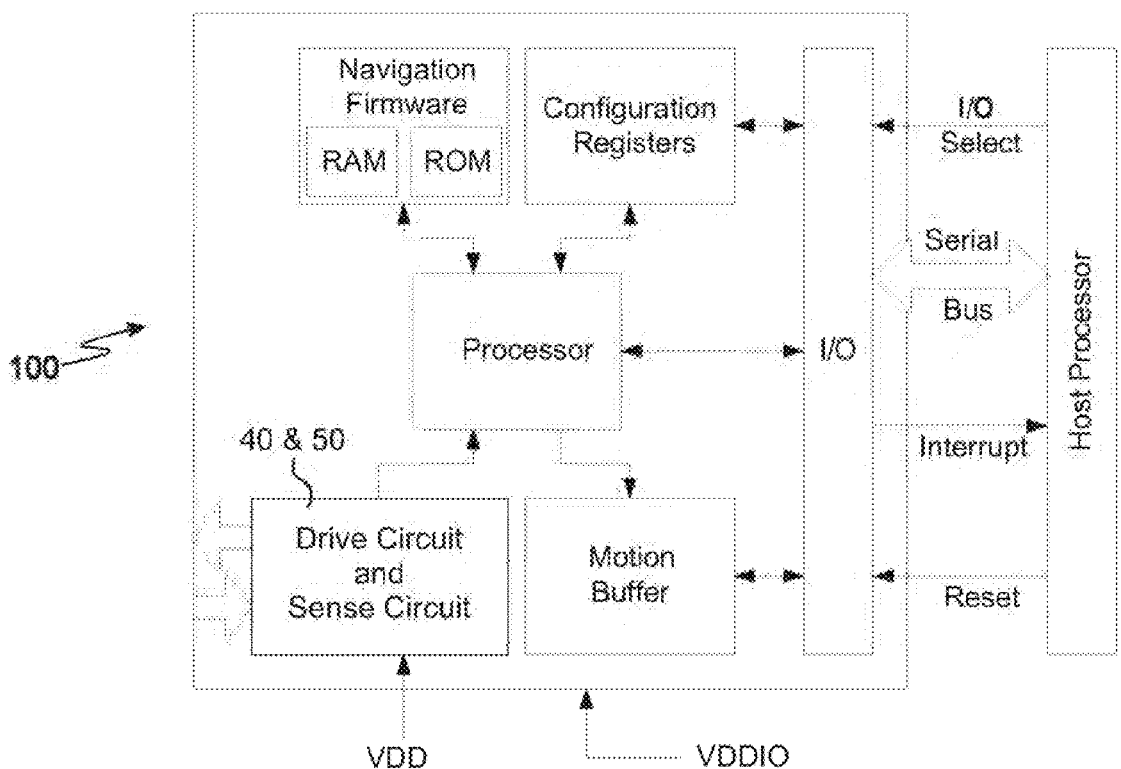
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel Controller designed to provide a touchscreen system with high-accuracy, on-screen navigation.

Figure 3:
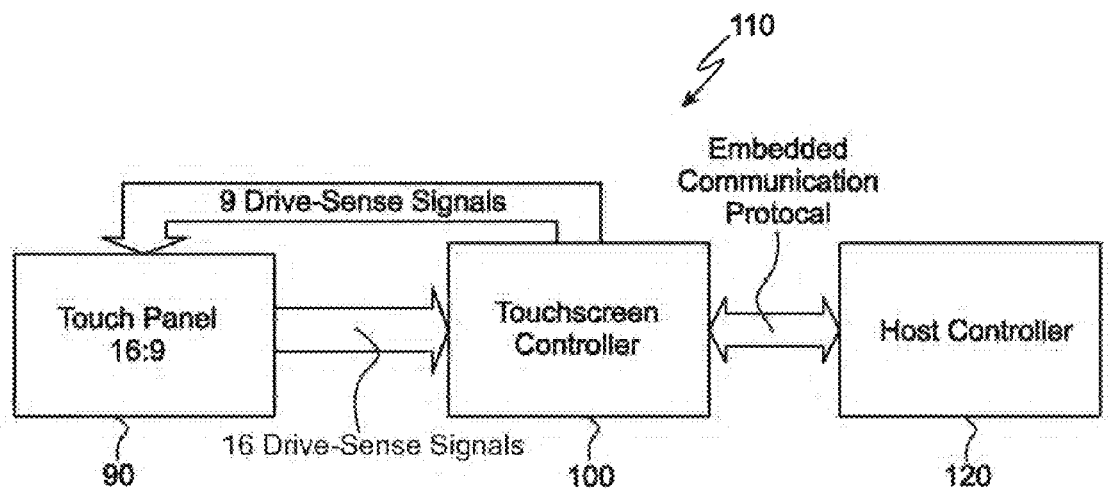
FIG. 3 shows one embodiment of a block diagram of a capacitive touchscreen system and a host controller.
Figure 4:
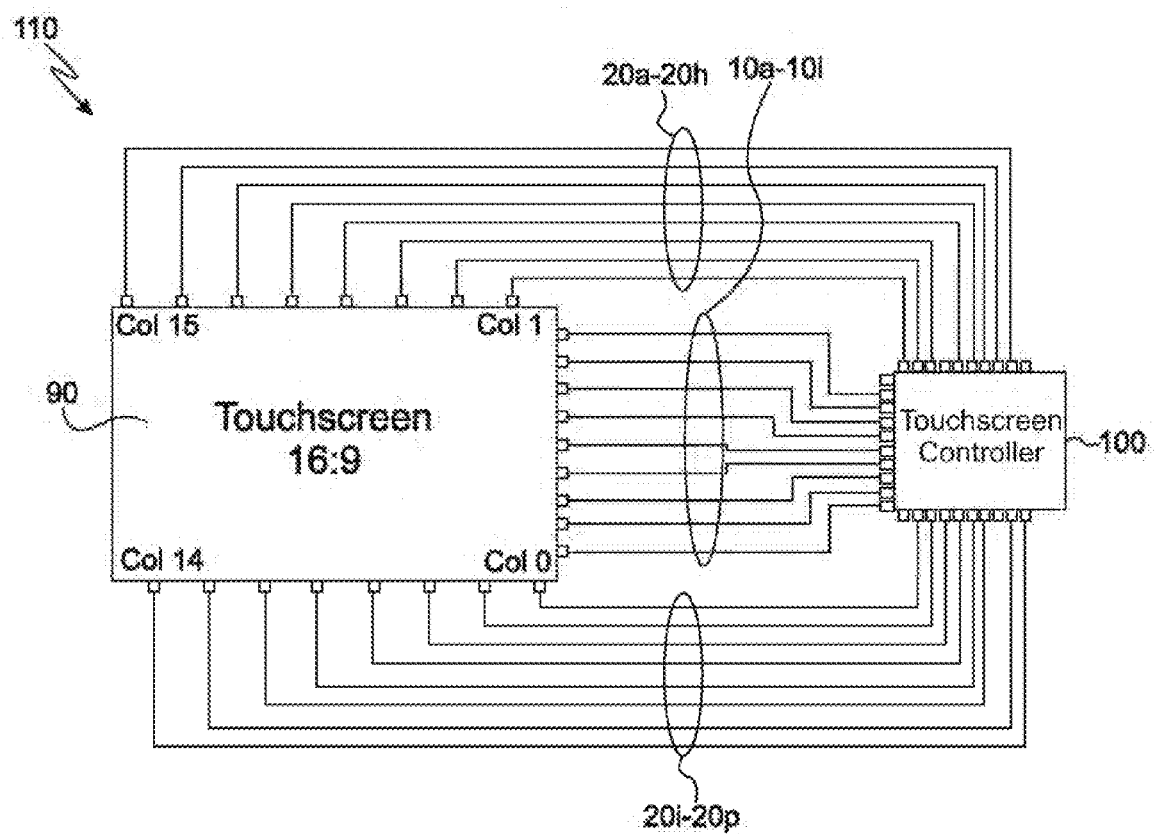
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen-solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 9 sense and drive signal lines and 16 drive and sense lines connected to an ITO grid on a touchscreen. Touchscreen controller 100 applies an excitation such as a square wave meander signal or other suitable type of drive signal to the drive electrodes that may have a frequency selected from a range between about 40 kHz and about 200 kHz. The AC signal is coupled to the sense lines via mutual capacitance. Touching panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 features multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 automatically shifts to the next-lowest power consumption mode. However, as power consumption is reduced the response time to touches increases.

Figure 5:
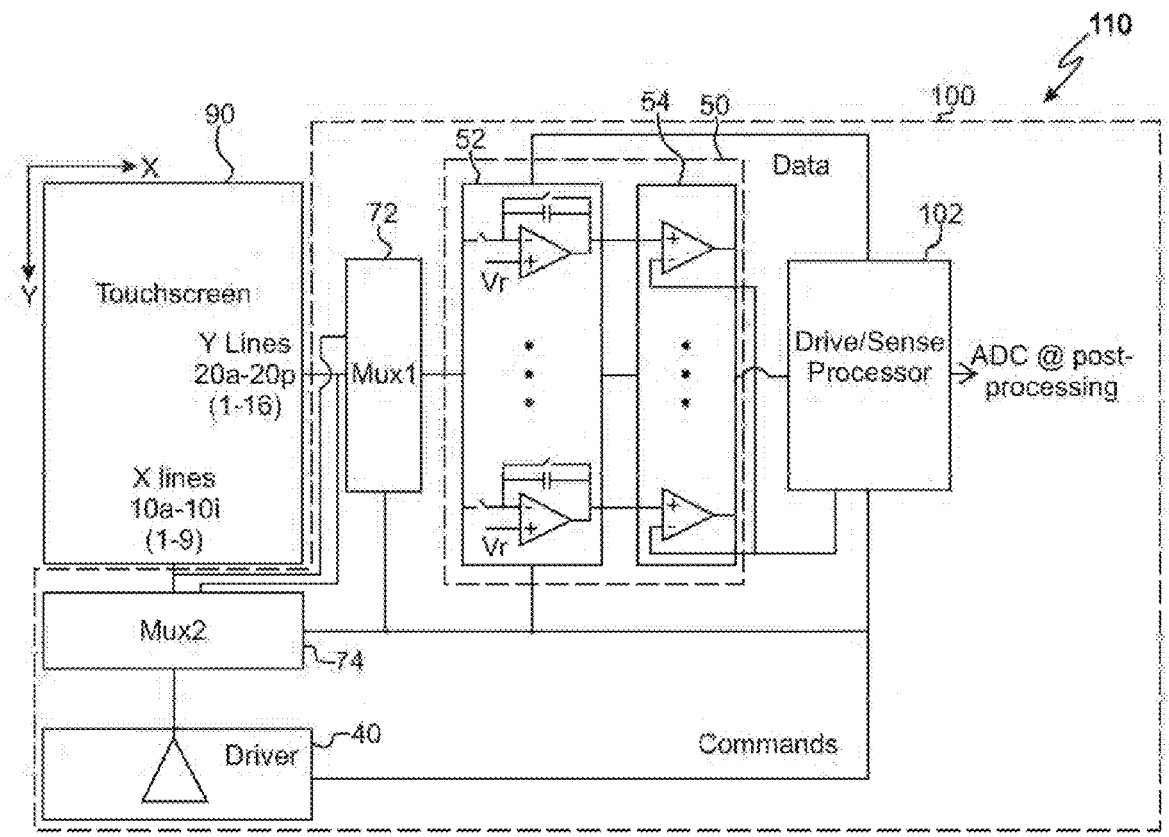
FIG. 5 shows a block diagram of one embodiment of a capacitive touchscreen system.
Figure 10:
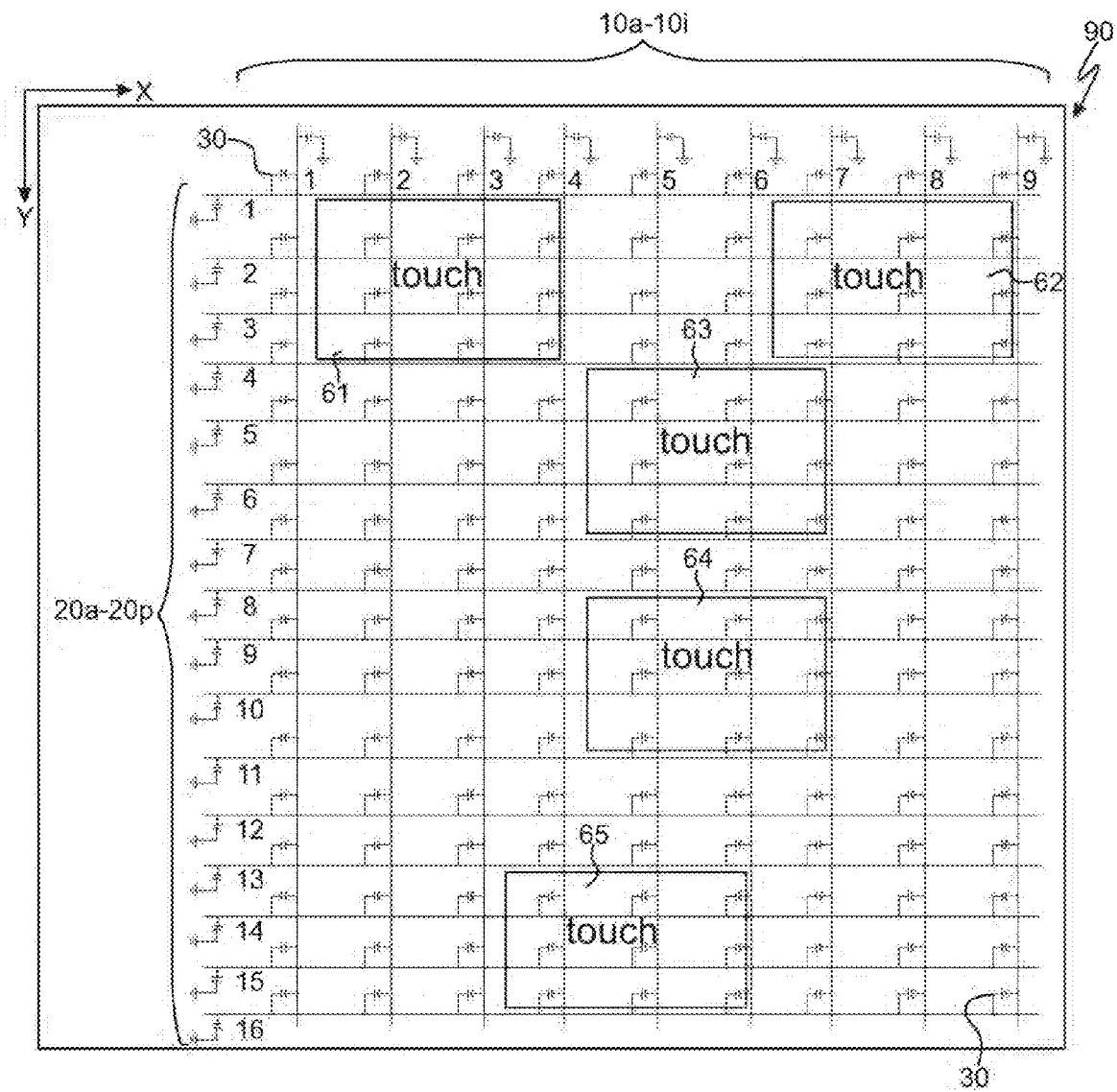
FIG. 10 shows one embodiment of a capacitive touchscreen.

According to one embodiment, and as shown in FIGS. 5 and 10, an ITO grid on the touchscreen 90 comprises rows 20a-20p (or Y lines 1-16) and columns 10a-10i (or X lines 1-9), where rows 20a-20p are operably connected to first multiplexer 72 and second multiplexer 74, and columns 10a-10i are operably connected to first multiplexer 72 and second multiplexer 74. One configuration for routing drive and sense lines to, touchscreen controller 100 is shown in FIG. 4

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Referring now to FIG. 5, there is shown one embodiment of a capacitive touchscreen system 110 comprising touchscreen 90 and touchscreen controller 100. As shown, touchscreen controller 100 comprises drive/sense processor 102, drive circuit 40, and sense circuit 50. In combination with operational control provided by drive/sense processor 102, first and second multiplexers 72 and 74 are used to interchangeably and selectably connect the individual circuits of drive circuit 40 and sense circuit 50 to the individual electrically conductive traces of the first plurality of electrically conductive traces 10a-10i (X lines 1-9) or to the second plurality of electrically conductive traces 20a-20p (Y lines 1-1) of touchscreen 90. The outputs provided by the individual charge integrator circuits of amplifier circuit bank 52 in sense circuit 50 are provided to corresponding individual comparators in comparator circuit bank 54. Signals stored in or generated by sense circuit 50 are output for further processing to drive/sense processor 102, which also controls drive circuit 40, as well as the timing and operation of first and second multiplexers 72 and 74. Note that the bank of amplifier circuits 52 comprises individual amplifier to circuits that comprise both a charge integrator circuit and a sample-and-hold capacitor, where the sample-and-hold capacitor circuit may be used to effect sense and storage functions.

As further shown in FIG. 5, sense circuit 50 may be interchangeably and selectably operably connected to the first plurality of electrically conductive traces 10a-10i (lines 1-9 in FIG. 10) or to the second plurality of electrically conductive traces 20a-20p (lines 1-16 in FIG. 10) of touchscreen 90 through first multiplexer 72 under the operational control of drive/sense processor 102. As shown in FIGS. 4, 5 and 10, touchscreen 90 comprises a first plurality of electrically conductive traces 10a-10i (corresponding respectively to X lines 1-9) arranged in rows or columns, and a second plurality of electrically conductive traces 20a-20p (corresponding respectively to Y lines 1-16) arranged in rows or columns arranged at an angle with respect to the rows or columns of the first plurality of electrically conductive traces 10a-10i. Mutual capacitances 30 (see FIG. 10) exist between the first and second pluralities of electrically conductive traces 10a-10i and 20a-20p at locations where the first and second pluralities of traces intersect, such mutual capacitances 30 changing in the presence of one or more fingers brought into proximity thereto.

In one embodiment, sense circuit 50 comprises a bank of individual switching and amplifying circuits 52, which in turn is followed by a bank of comparators 54 corresponding individually thereto. In one embodiment, the individual sense circuits in banks 52 and 54 comprise switching circuitry operably and selectably connectable to corresponding traces on touchscreen 90 (e.g., the second plurality of electrically conductive traces 20a-20p, or Y lines 1-16) and to an amplifier and a capacitor connected to the output and negative input thereof (see bank of amplifier circuits 52 in FIG. 5), and to a comparator operably connected to the output of each such amplifier circuit (see bank of comparator circuits 54 in FIG. 5), all occurring under the control of drive/sense processor 102. As further shown in FIG. 5, and in one embodiment, the individual drive circuits within drive circuit 40 are operably connected to corresponding ones of the first plurality of electrically conductive traces or lines 10a-10i through second multiplexer 74 under the control of drive/sense processor 102.

In other embodiments, individual sense circuits of amplifier bank 52, and comparator bank 54 may be interchangeably and selectably connected to the first plurality of electrically conductive traces 10a-10i, or to the second plurality of electrically conductive traces 20a-20p through first multiplexer 72 under the control of drive/sense processor 102. Likewise, the individual drive circuits within drive circuit 40 may be interchangeably and selectably connected to corresponding ones of the first plurality of electrically conductive traces or lines 10a-10i, or the second plurality of electrically conductive traces or lines 20a-20p, through second multiplexer 74 under the control of drive/sense processor 102.

As further shown in FIG. 5, drive/sense processor 102, which preferably although not necessarily forms a portion of touchscreen controller 100 (which is preferably a chip, an integrated circuit or an ASIC), is operably connected to sense circuit 50, drive circuit 40, first multiplexer 72, and second multiplexer 74, respectively, and is configured to control the operation of the plurality of sense circuits in sense circuit 50 to sense at least some of mutual capacitances 30 through the first or second pluralities of traces 10a-10i and/or 20a-20p, sense circuit 50, and first multiplexer 72, and to control the operation of drive circuit 40 to drive at least some of the first or second pluralities of traces 10a-10i and/or 20a-20p through second multiplexer 74. Drive circuit 40, sense circuit 50, and the first and second multiplexers 72 and 74 are controlled by drive/sense processor 102 such that when mutual capacitances 30 are being sensed by the sense circuits 50 through the first plurality of traces 10a-10i, drive circuit 40 is driving the second plurality of traces 20a-20p. Drive circuit 40, sense circuit 50, and the first and second multiplexers 72 and 74 are further controlled by drive/sense processor 102 such that when mutual capacitances 30 are being sensed by sense circuits 50 through the second plurality of traces 20a-20p, drive circuit 40 is driving the first plurality of traces 10a-10i.

Figure 6:
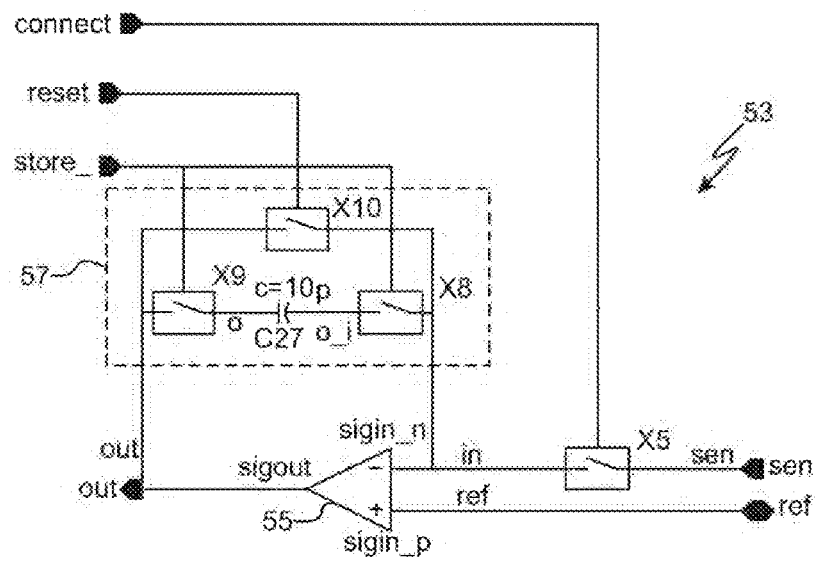
FIG. 6 shows one embodiment of a charge integrator circuit, with a sample-and-hold capacitor.

Referring now to FIG. 6, there is shown one of many possible embodiments for one of the sense circuits of bank of amplifier circuits 52 of sense circuit 50 in FIG. 5. As shown in FIG. 6, amplifier sensing circuit 53 comprises a charge integrator amplifier operably connected to a sample-and-hold capacitor C27, where capacitor C27 may be disconnected or left floating with charge collected therein for use in further processing by drive/sense processor 102 is shown in FIG. 4. The positive input of the charge integrator amplifier is operably connected to an appropriate reference potential $V_r$ (or ref). One embodiment of a command sequence for logic control that permits the acquisition of sensed signals by circuit 53 of FIG. 6 is shown in FIG. 7.

Figure 7:
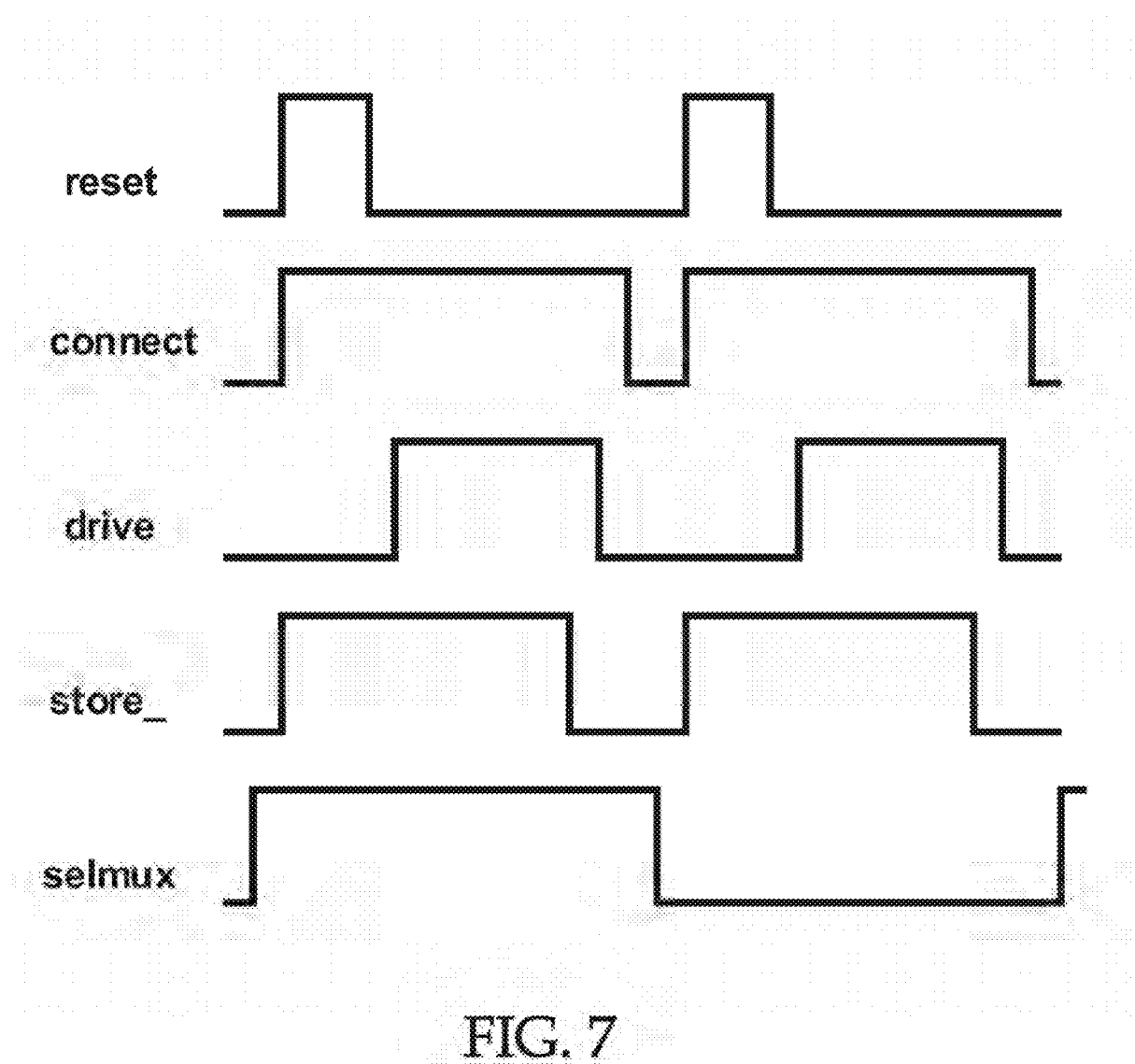
FIG. 7 shows command logic signals corresponding to portions of the circuit shown in FIG. 6.

Note that the command sequence and signals shown in FIG. 7 are particular to circuit 53 of FIG. 6. Other embodiments of circuit 53 are also contemplated that achieve the same or substantially the same functionality using suitable electrical and/or electronic components and circuitry, as will now be appreciated by those skilled in the art. Those skilled in the art will also understand that many other command sequences and signals other than those shown in FIG. 7 may be employed in conjunction with circuits other than circuit 53 of FIG. 6 to provide substantially the same functionality and results. Reference to FIGS. 6 and 7 will show that when a logical signal high state signal is presented to the switch drive terminal of circuit 53 the switch is closed.

Continuing to refer to FIGS. 6 and 7, note that the sen line of the circuit of FIG. 5 is connected to single mutual capacitance 30 using selected ones of the first and second pluralities of electrically conductive traces 10a-10i (X lines 1-9) and 20a-20p (Y lines 1-16) disposed along the X and Y axes (see FIG. 10). As a result, mutual capacitance 30 sensed by circuit 53 is representative of a single cross-coupled capacitor located at the single intersection of selected ones of the first and second pluralities of electrically conductive traces 10 and 20, where the magnitude of mutual capacitance 30 depends on the presence or non-presence of a finger, stylus or other touching device brought into proximity thereto on touchscreen 90. One of the individual drive circuits of drive circuit 40 is selected to drive a selected line from among traces 10a-10i or 20a-20p, while an individual sense circuit from sense circuit 50 is selected to sense a selected line from among traces 10a-10i or 20a-20p through mutual capacitance 30. Each of individual sense circuits of sense circuit 50 shown in FIG. 5 is a charge integrator circuit with sample and hold capacitors, which as discussed above may be disconnected or left floating with the collected charge, and which may be used for further processing.

FIGS. 5 and 6 further show that the individual amplifier and sample-and-hold circuits within sense circuit 50 may comprise circuit 53 (for the individual drive circuits disposed within bank of amplifier circuits 52), sense circuit 50 may further comprise logic circuitry configured to permit each of the individual amplifier and comparator circuits in amplifier bank 52 and comparator bank 54 to operate selectably and interchangeably under the control of drive/sense processor 102 as individual sense circuits. Note that drive/sense processor 102 may be configured to control drive circuit 40 such that the traces of the first or second pluralities of traces 10a-10i or 20a-20p may be driven substantially simultaneously, and such that the traces of the first or second pluralities of traces 10a-10i and 20a-20p may be sensed substantially simultaneously by sense circuit 50.

Continuing to refer to FIGS. 5 and 6, each of the comparators in comparator bank 54 in sense circuit 50 is configured to detect a voltage associated with its corresponding mutual capacitance 30 at a predetermined threshold voltage $V_t$. At least some of the comparators in comparator bank 54 may also be configured to detect voltages associated with their corresponding mutual capacitances 30 at predetermined high and low voltage thresholds. Moreover, drive/sense processor 102 may further be configured to control the drive and sense circuits 40 and 50 to sense substantially simultaneously multiple mutual capacitances on touchscreen 90, or to detect the locations of multiple simultaneous or near-simultaneous touches on touchscreen 90, more about which is said below. The detection of locations of multiple simultaneous or near-simultaneous touches on touchscreen 90 may be accomplished using bank of comparators 54 to detect voltages associated with the mutual capacitances 30 corresponding thereto, more about which is also said below. Drive/sense processor 102 may further be configured to control driving selected ones of the first and second pluralities of traces 10a-10i and 20a-20p on the basis of the locations of touches that have already been detected, and/or to control sensing selected ones of the mutual capacitances 30 on the basis of the locations of touches that have already, been detected, more about which is said below. Drive/sense processor 102 may further be configured to generate tags associated with the locations of detected touches, and/or to generate tags associated with the magnitudes of detected touches, more about which is also said below.

In one embodiment, the angle between the first and second pluralities of traces 10a-10i and 20a-20p is about 90 degrees, but may be any suitable angle such as, by way of example, about 15 degrees, about 30 degrees, about 45 degrees, about 60 degrees, or about 75 degrees. The first and second pluralities of electrically conductive traces 10a-10i and 20a-20p may be disposed in substantially parallel but vertically-offset first and second planes, respectively, or may be disposed in substantially the same plane. In one embodiment, the first and second pluralities of electrically conductive traces 10a-10i and 20a-20p comprise indium tin oxide ("ITO"), or any other suitable electrically conductive material. A liquid crystal display may be disposed beneath the first and second pluralities of electrically conductive traces 10a-10i and 20a-20p, or any other suitable image display. The first and second pluralities of electrically conductive traces 10a-10i and 20a-20p are preferably disposed on a substrate comprising an electrically insulative material that is substantially optically transparent.

Note that touchscreen system 110 may be incorporated into or form a portion of an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device, a household appliance, or any other suitable electronic device.

In another embodiment, there is provided a method of detecting touches on the foregoing capacitive touchscreen system comprising: (a) driving the first to plurality of electrically Conductive traces 10a-10i through drive circuit 40; (b) sensing mutual capacitances 30 through the second plurality of electrically conductive traces 20a-20p and the sense circuit 50; (c) driving the second plurality of electrically conductive traces 20a-20p through drive circuit 40; (d) sensing mutual capacitances 30 through the first plurality of electrically conductive traces 10a-10i and sense circuit 50, and (e) detecting the locations of one or more touches on touchscreen 90 on the basis of sensed mutual capacitances 30 exceeding predetermined voltage thresholds $V_t$.

Such a method may further comprise driving substantially simultaneously the first plurality of electrically conductive traces 10a-10i through drive circuit 40, driving substantially simultaneously the second plurality of electrically conductive traces 20a-20p through drive circuits 40, sensing substantially simultaneously at least some of the mutual capacitances 30 through sense circuit 50, and/or sensing substantially simultaneously at least some of the mutual capacitances 30 through the sense circuit 50. Note that sensing may comprise detecting voltages associated with mutual capacitances 30.

In one embodiment, a method may also comprise detecting the locations of multiple simultaneous or near-simultaneous touches on the touchscreen 90 through sense circuit 50 and bank of comparators 54, detecting voltages associated with mutual capacitances 30 corresponding thereto, driving selected ones of the individual drive circuits disposed within and forming a portion of drive circuit 40 on the basis of the locations of touches that have already been detected, sensing selected ones of the individual sense circuits disposed within and forming a portion of sense circuit 40 on the basis of locations of touches that have already been detected, generating tags associated with the locations of detected touches, to and generating tags associated with the magnitudes of detected touches.

Figure 8:
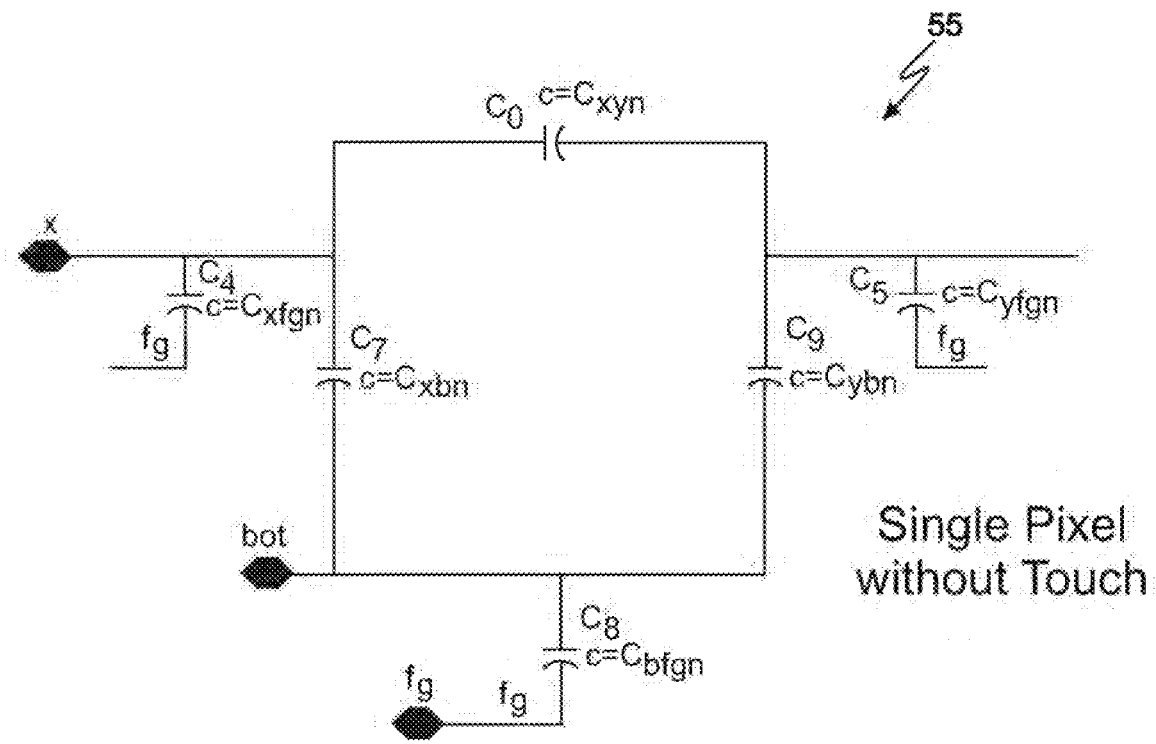
FIG. 8 shows one embodiment of a 3×3 pixel or touch sensor circuit with no finger touch applied or in proximity thereof.
Figure 9:
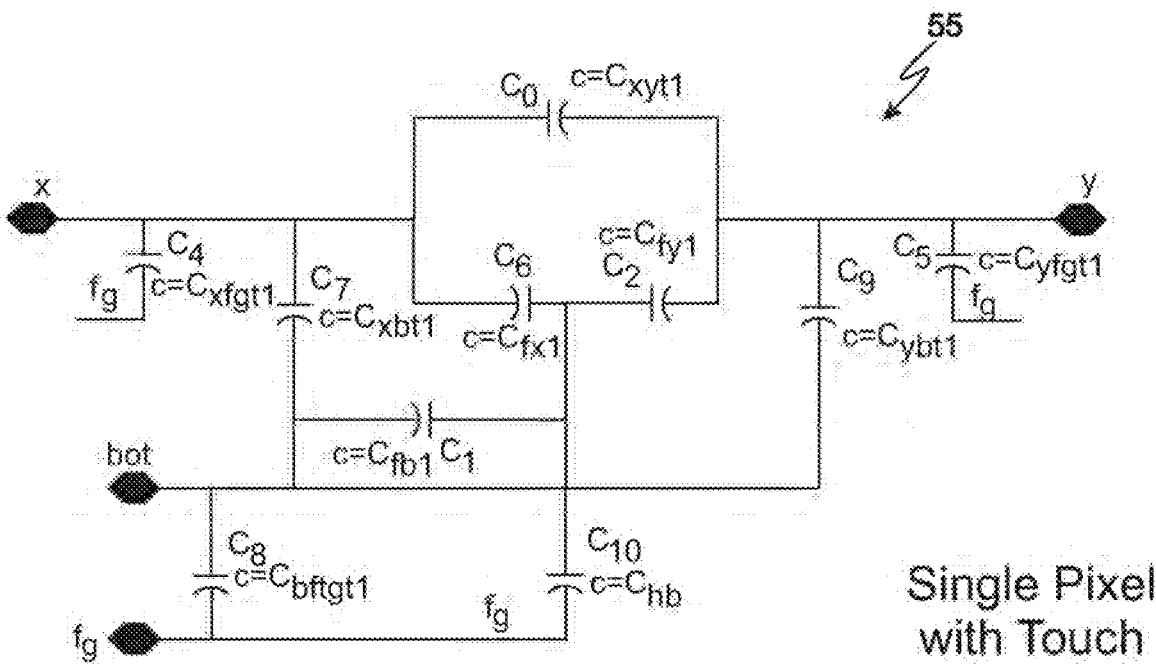
FIG. 9 shows one embodiment of the 3×3 pixel or touch sensor circuit of FIG. 8 with a finger touch applied or in proximity thereto.

Touches 61 through 65 shown in FIG. 10 each cover a touch region of 3 pixels by 3 pixels. Accordingly, FIG. 8 shows one embodiment of a pixel or touch sensor circuit with no finger touch applied or in proximity thereto, while FIG. 9 shows one embodiment of the pixel or touch sensor circuit of FIG. 8 with a finger touch applied or in proximity thereto. Note that circuit 55 shown in FIG. 8 is located on a portion of touchscreen 90 where mutual capacitances 30 are available throughout the 3×3 sensing region. Each of the five touches or touch regions 61, 62, 63, 64 and 65 shown in FIG. 10 represents a 3×3 cluster of pixels or sensing circuits, where the pixel capacitances thereof deviate from those on touchscreen 90 that are not associated with touches or touch regions. In a touch region, a finger electrode is connected to an electric field ground by a human body capacitor (Chb=100 pF). The pixel capacitor values shown in FIGS. 8 and 9 are as follows: Cxyn—overlapping electrodes with no touch; Cxfgn—X electrode to field ground with no touch; Cyfgn—Y electrode to field ground with no touch; Cxyt1—overlapping electrodes in the presence of a touch; Cxfgt1—X electrode to field ground with touch; Cyfgt1—Y electrode to field ground with touch; Cfx1—finger to X electrode; Cfy1—finger to Y electrode; Chb—human body capacitor.

Referring now to FIG. 10, there is shown one embodiment of a 9×16 touchscreen 90 comprising a first plurality of electrically conductive traces 10a through 10i (X lines 1-9) and a second plurality of electrically conductive traces 20a through 20p (Y lines 1-16). In one embodiment, the mutual capacitance 30 associated with a given pixel on touchscreen 90 has a capacitance of about 1.1 pF when no finger touch is made over the pixel. In the presence of a finger touch directly over such the pixel, however, the mutual capacitance associated with that pixel changes to about 0.9 pF. The mutual capacitances associated with pixels surrounding the pixel over which the touch is centered, but which are contained within the 3×3 pixel cluster associated with the touch, change to about 1.04 pF. Note that terminal "bot" in FIGS. 8 and 9 corresponds to a Conductive bottom electrode, which may or may not be present touchscreen 90.

In one embodiment, sensing, driving and preprocessing of signals provided by and from touchscreen 90 follow the drive and sense protocols discussed below. The processing of signals provided by touchscreen 90 resulting from the provision of driving signals thereto, and the sensing of signals resulting from the presence of one or more finger placed in proximity thereto, is described with reference to the block diagram shown in FIG. 5.

In one embodiment, driving of touchscreen 90 starts with drive circuit 40 driving all of X lines 1-9 (the first plurality of electrically conductive traces, 10a-10i) while electric charge is acquired in the charge integrator circuits of sense circuit 50 operably connected to the Y lines 1-16 (the second plurality of electrically conductive traces, 20a-20p), followed by the storage of the Y line signals into the hold capacitors of the individual sense circuits of sense circuit 50. Note that the integration capacitors described above may be used for signal storage. During driving, drive circuit 40 is operably connected to X lines 1-9 configured in a buffer mode while sense circuit 50 is operably connected to the Y lines configured in an integrator mode. The sense command sequence is similar to the one described for the circuit described above in connection with FIGS. 6 and 7.

Charge data corresponding to the Y line signals acquired in the capacitors of sense circuit 50 are then presented as electric potentials to the comparators of comparator bank 54, where signals exceeding a predetermined threshold $V_t$ are detected. As described above, FIG. 6 shows one embodiment of a single sense circuit configured to sense such signals and present them to comparator 54 corresponding thereto. In one embodiment, while presenting data for the detected Y line signals to the comparators, the acquisition or sensing of X line signals may begin by configuring drive circuit 40 to be operably connected to the Y lines for operation in the drive mode, and applying the drive signals to all the Y lines while acquiring charge into sense circuit 50 configured as charge integrator circuits operably connected to the X lines. Such functionality can be accomplished by providing a second capacitor in each of the individual sense circuits of sense circuit 50.

Figure 11:
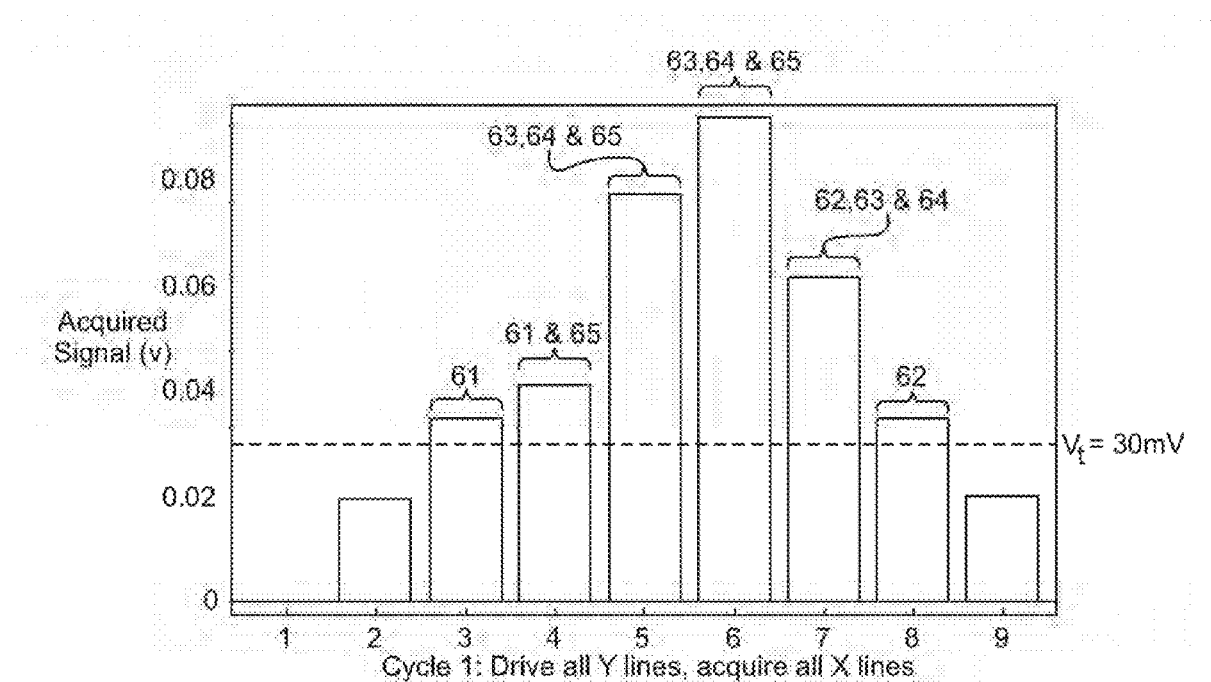
FIGS. 11 through 21 show histograms corresponding to signals sensed along X or Y lines of the touchscreen of FIG. 9.

To detect the positions of multiple simultaneous or near-simultaneous finger touches 61, 62, 63, 64 and 65 made on touchscreen 90 of FIG. 10, eleven simulated successive sensing and driving cycles performed along the X and Y axes of touchscreen 90 in FIG. 10 are illustrated as histograms in FIGS. 11 though 21, which correspond, respectively, to cycles 1 through 11. As will be seen by referring to the histograms, overlapping and non-overlapping touches sensed along the X and Y axes correspond to multiple sensed touches and are clearly visible as such.

When referring to FIG. 10 and the histograms of sensed touch signals shown in FIGS. 11 through 21, it will be seen that three touches for X-axis-sensed signals overlap along the same X lines (see touches 63, 64 and 65 disposed along X lines 5 and 6), and that one touch for Y-axis-sensed signals overlap along the same Y line (see touches 61 and 62 disposed along Y lines 2, 3 and 4). As described above, the touch region for each touch occupies an area of three pixels by three pixels. Further processing was based on selection criteria which to characterized the sensing process as three neighboring touch signals exceeding a predetermined threshold $V_t$. More advanced processing criteria may also be used to select signal processing regions of interest using sensed signals which exceed different voltage thresholds, such as a window comparison (higher than the low threshold $V_{tL}$ and lower than the high threshold $V_{tH}$). To disentangle clearly non-overlapping touches using signals sensed along the X and Y axes, different or modified selection criteria can be used. A relatively simple touch sensing method or algorithm is described in, detail below, however.

As mentioned above, the touch sensing method or algorithm described below is based on a selection of regions of interest that have an area of 3 pixels by 3 pixels, where neighboring sensed signals exceed a predetermined signal threshold $V_t$. In the touch sensing examples discussed in further detail herein, $V_t$ was selected to be 30 mV. Note that different combinations of different sensed readout lines, in combination with the processing of sensed signals, may be used to separate multiple finger touches that occur in close proximity to one another.

As shown in FIG. 10, multiple simultaneous or near-simultaneous touches 61 through 65 are located at different coordinates or locations on touchscreen 90. Touch 61 is located at pixel or touchscreen location X(2-4), Y(2-4). Touch 62 is located at pixel or touchscreen location X(2-4), Y(7-9). Touch 63 is located at pixel or touchscreen location X(5-7), Y(5-7). Touch 64 is located at pixel or touchscreen location X(5-7), Y(9-11). Touch 65 is located at pixel or touchscreen location X(4-6), Y(14-16).

FIG. 11 represents the results of simultaneously driving all Y lines and simultaneously sensing all X lines during cycle 1.

As shown in FIG. 11, touches 61, 62, 63, 64 and 65 are all detected by sense circuit 50, as such touches cause signals to be sensed by sense circuit 50 that exceed a threshold of 30 mV (or $V_t$). As further shown in FIG. 11, touch 61 detected along X line 3 and touch 62 detected along X line 8 are the only touches disposed along such lines, and therefore cause lower-amplitude signals to be detected on such lines than the higher-amplitude signals detected on X lines 4 through 7 (each of which lines corresponds to multiple touches being disposed therealong). Determining which of touches 61, 62, 63, 64 and 65 corresponds to unique X, Y locations on touchscreen 90 is not possible after having completed only cycle 1.

Figure 12:
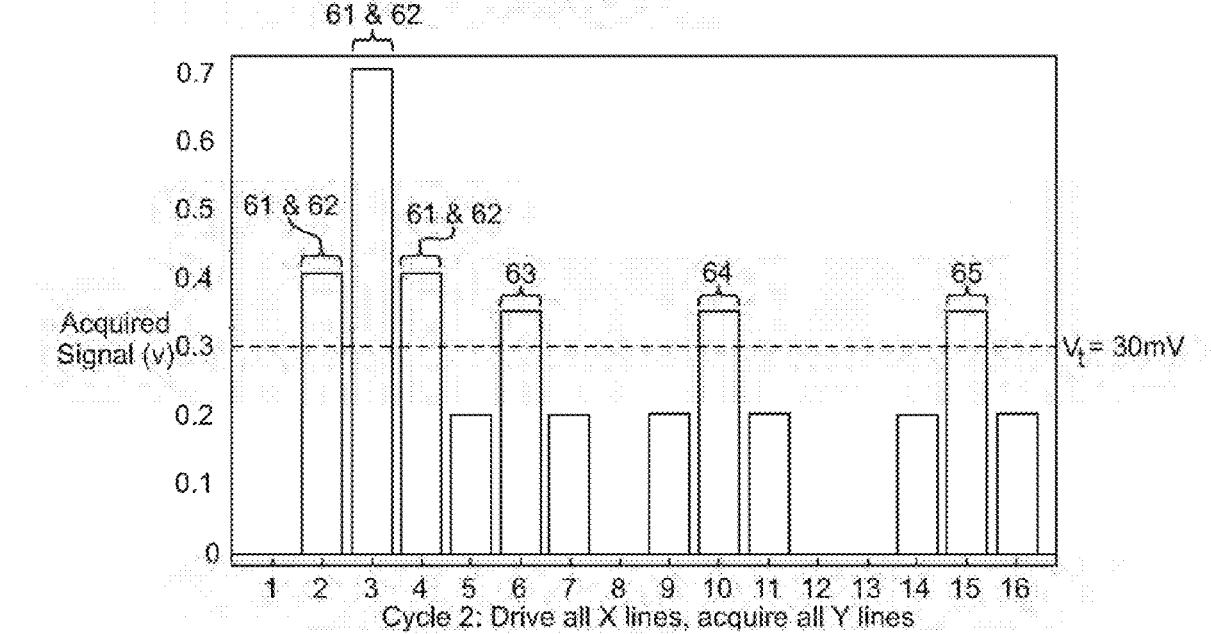

FIG. 12 represents the results of simultaneously driving all X lines and simultaneously sensing all Y lines during cycle 2. As shown in FIG. 12, touches 61, 62 and 63, and 63 and 65 are detected by sense circuits 50, as such touches cause signals to be sensed by sense circuit 50 that exceed a threshold of 30 mV (or $V_t$). As further shown in FIG. 11, touches 63, 64 and 65 cause lower-amplitude signals to be detected on Y lines 6, 10 and 15, respectively, than the higher-amplitude signal detected on Y line 3 (which correspond to multiple touches 61 and 62 being disposed along Y line 3). Determining which of touches 61, 62, 63, 64 and 65 corresponds to which X, Y locations on touchscreen 90 is still not possible after having completed only cycles 1 and 2. But the information obtained during cycles 1 and 2 that has been presented to drive/sense processor 102 is employed by drive/sense processor 102 to determine which from among selected X and Y lines should next be driven and sensed during cycle 3 so that the process of determining the precise and unique (X,Y) locations for each of the individual touches can begin.

Figure 13:
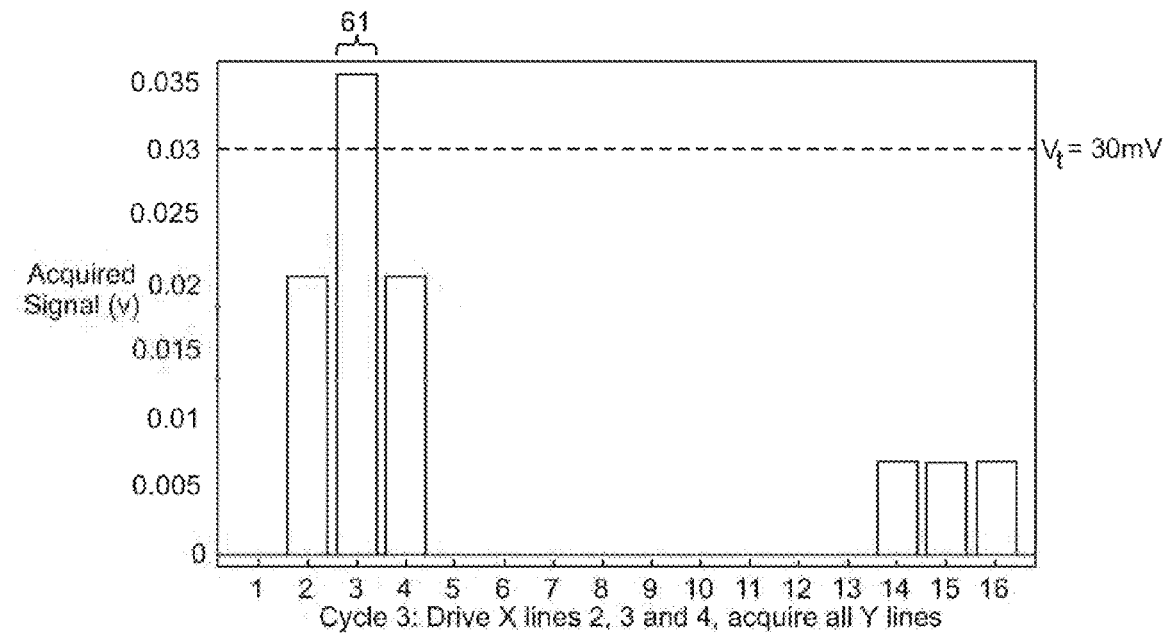

Referring now to FIG. 13, there are shown the results obtained by driving only X lines 2, 3 and 4 (which lines have been selected to be driven by drive/sense processor 102 on the basis of the sensed signals and their corresponding locations determined in cycles 1 and 2), and sensing all the Y lines. As a result, touch 61 is determined during cycle 3 to be centered at Y location Y(3), and corresponds to the only sensed signal exceeding the threshold voltage $V_t$.

Figure 14:
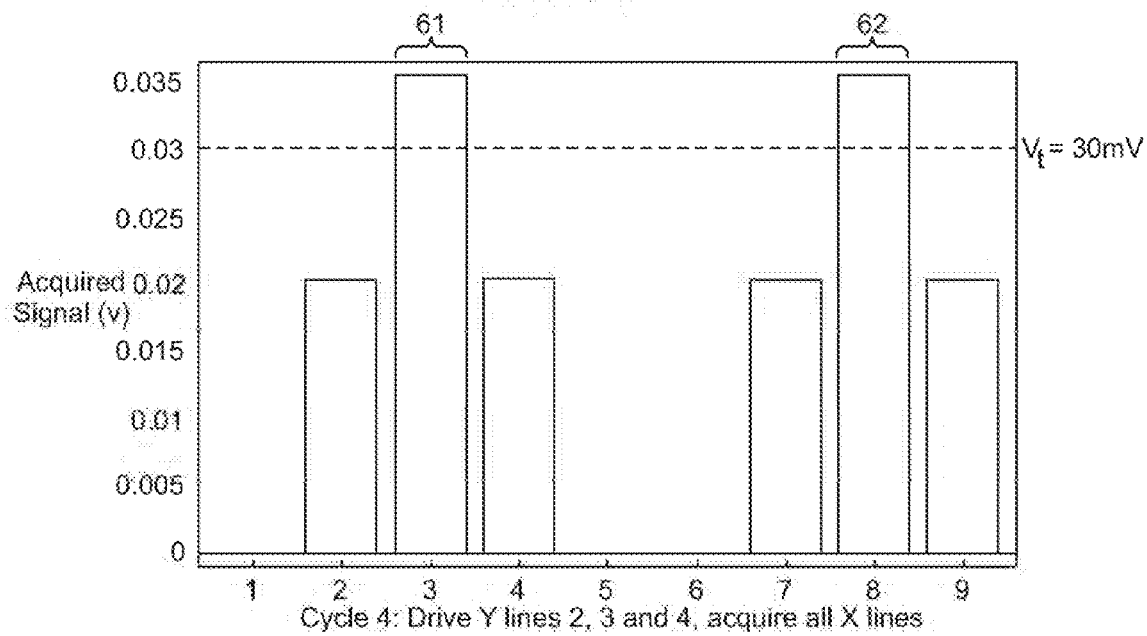

Cycle 4 of FIG. 14 follows cycle 3. FIG. 14 shows the results obtained by driving only Y lines 2, 3 and 4 (which lines have been selected to be driven by drive/sense processor 102 on the basis of the sensed signals and their corresponding locations determined in cycles 1, 2 and 3), and sensing all the X lines. As a result, touch 61 is determined during cycle 4 to be centered at X location X(3), and touch 62 is determined during cycle 4 to be centered at X location X(8), touches 61 and 62 corresponding to the only sensed signals exceeding the threshold voltage $V_t$. Now the cluster X,Y coordinates of touch 61 have been determined by sense/drive processor 102, and data corresponding to such cluster coordinates are multiplexed for parallel digitization and further processing from drive/sense processor 102 to touchscreen controller 100.

Figure 15:
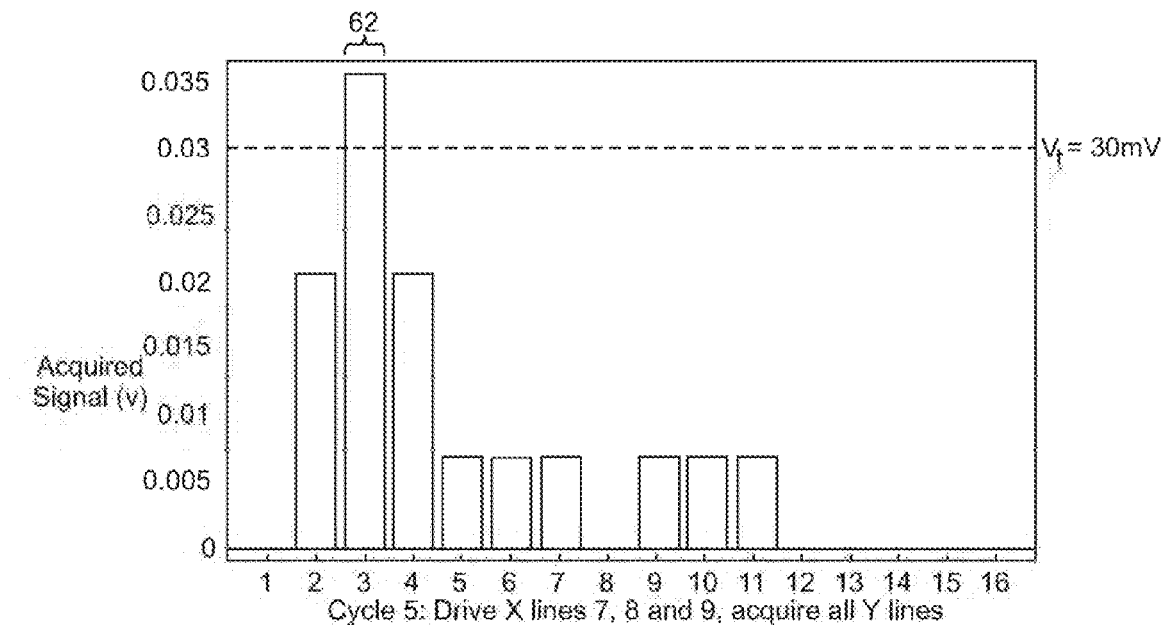

Cycle 5 of FIG. 15 follows cycle 4. FIG. 15 shows the results obtained by driving X lines 7, 8 and 9 (which lines have been selected to be driven by drive/sense processor 102 on the basis of the sensed signals and their corresponding locations determined in cycles 1 through 4), and sensing all the Y lines. As a result, touch 62 is determined during cycle 5 to be centered at X location X(3), as touch 62 corresponds to the only sensed, signal, exceeding the threshold voltage $V_t$. Now the cluster X,Y coordinates of touch 62 have been determined by sense/drive processor 102, and data corresponding to such cluster coordinates are multiplexed for parallel digitization and further processing from drive/sense processor 102 to touchscreen controller 100.

Figure 16:
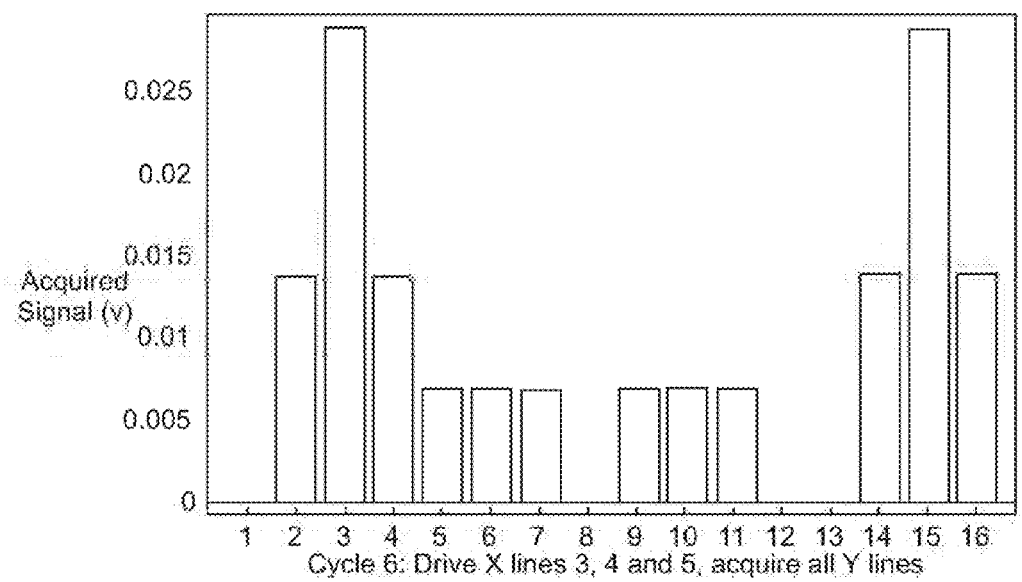

Drive/sense processor 102 again analyzes the sensed data that have been presented to it by sense circuit 50 during the preceding cycles, and in cycle 6 proceeds to instruct drive circuit 40 to drive X lines 3, 4 and 5, and sense circuit 50 to sense all Y lines. The results of this particular sequence of driving and sensing commands are shown in FIG. 16, where it will be seen that none of the signals sensed by sense circuit 50 trigger the detection of any voltages along any Y lines that equal or exceed the threshold voltage $V_t$. As a result, no data corresponding to any detected cluster coordinates are transferred from drive/sense processor 102 to touchscreen controller 100 during cycle 6.

Figure 17:
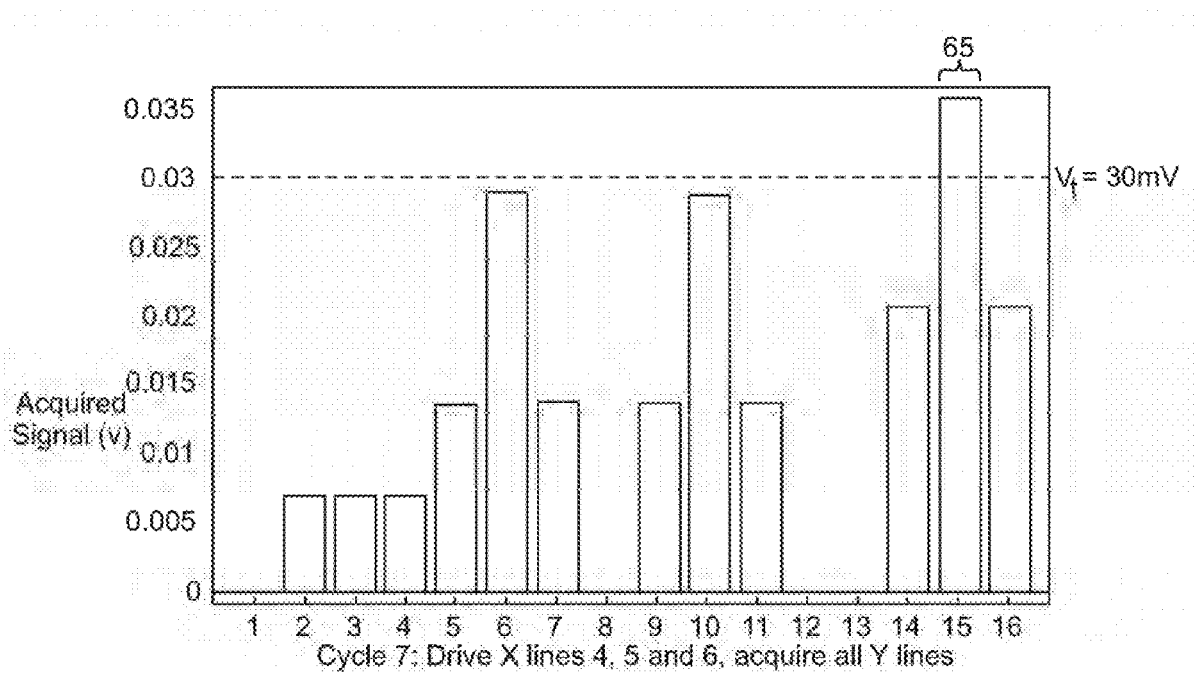

Drive/sense processor 102 again analyzes the sensed data that have been presented to it by sense circuit 50 during preceding cycles 1 through 6, and in cycle 7 drive/sense processor 102 instructs drive circuit 40 to drive X lines 4, 5 and 6, and sense circuit 50 to sense all Y lines. The results of this particular sequence of driving and sensing commands are shown in FIG. 17, where it will be seen that a threshold voltage is detected along Y line 15, which corresponds to single touch 65 being disposed along Y lines 14, 15 and 16.

Figure 18:
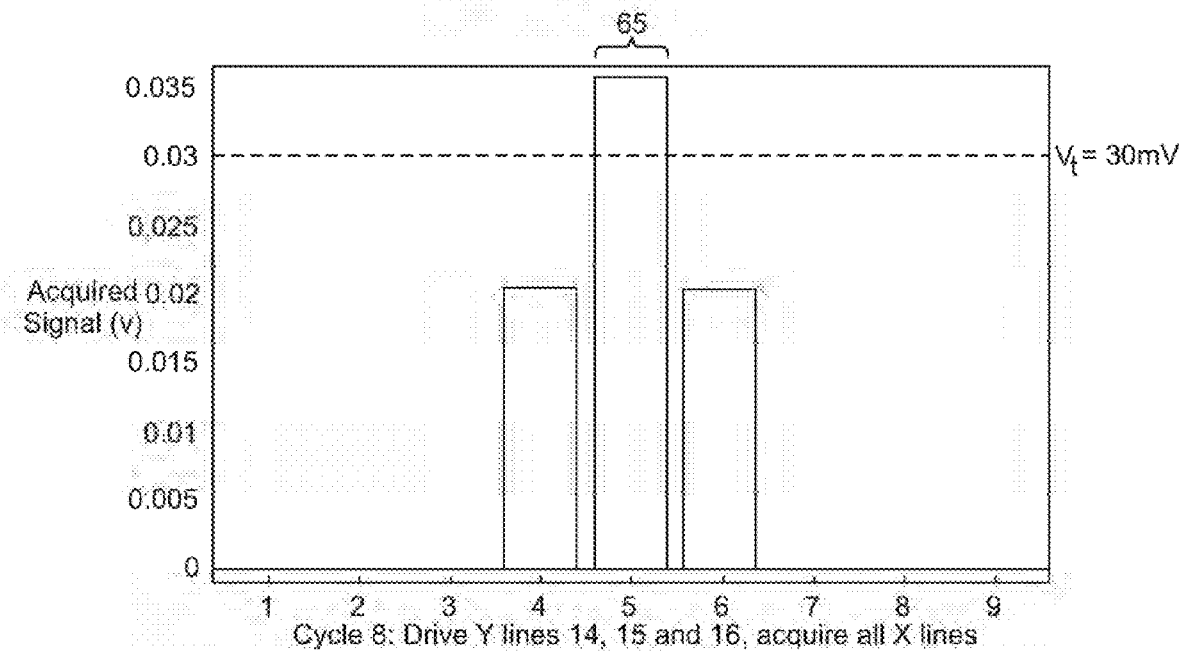

Cycle 8 of FIG. 18 follows cycle 7. FIG. 18 shows the results obtained by driving Y lines 14, 15 and 16 (which lines have been selected to be driven by drive/sense processor 102 on the basis of the sensed signals and their corresponding locations determined in cycles 1 through 7), and sensing all the X lines. As a result, touch 65 is determined during cycle 8 to be centered at X location X(5), as touch 65 corresponds to the only sensed signal exceeding the threshold voltage $V_t$. Now the cluster X,Y coordinates of touch 65 have been determined by sense/drive processor 102, and data corresponding to such cluster coordinates are multiplexed for parallel digitization and further processing from drive/sense processor 102 to touchscreen controller 100.

Figure 19:
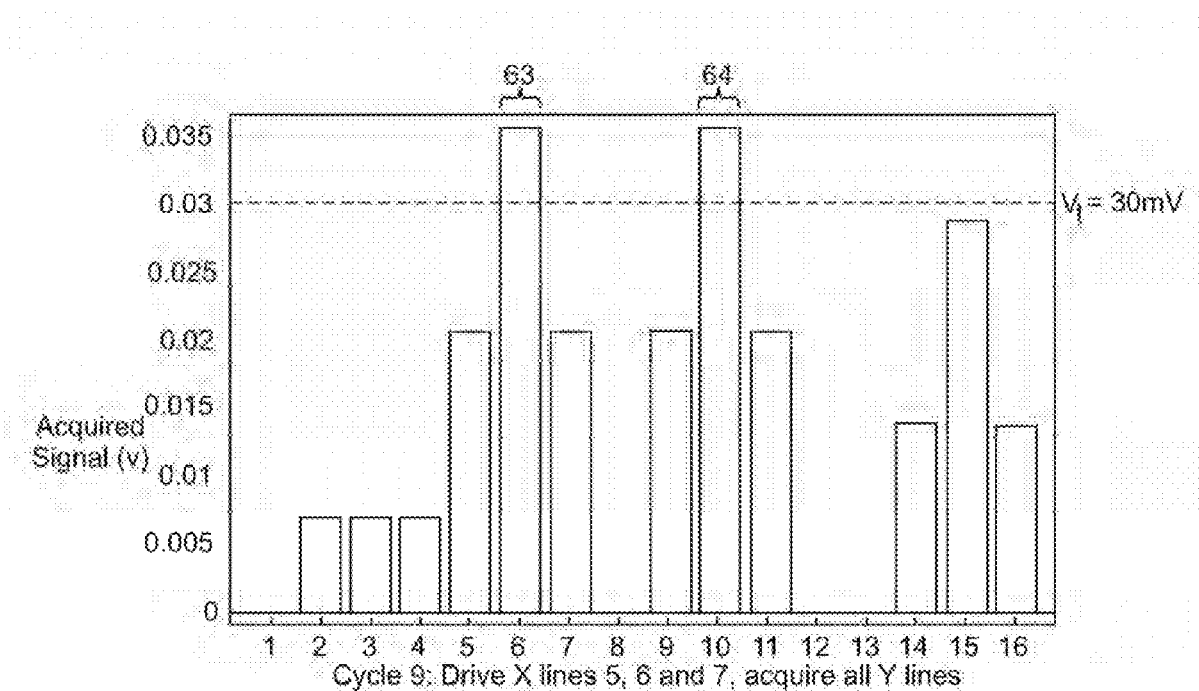

The result of cycle 8 is that a further region of interest for subsequent driving and sensing signals is identified by drive/sense processor 102, which during cycle 9 instructs drive circuit 40 to drive X lines 5, 6 and 7, and sense circuit 50 to sense all Y lines. The results of driving and sensing for cycle 9 are shown in FIG. 19, where touches 63 and 64 are detected as being centered at X coordinates X(6) and X(10), respectively, owing to threshold voltages $V_t$ being detected along X lines 6 and 10. Insufficient information is provided during cycle 9, however to permit the unique and precise X,Y locations of touches 63 and 64 to be determined by sense/drive processor 102.

Figure 20:
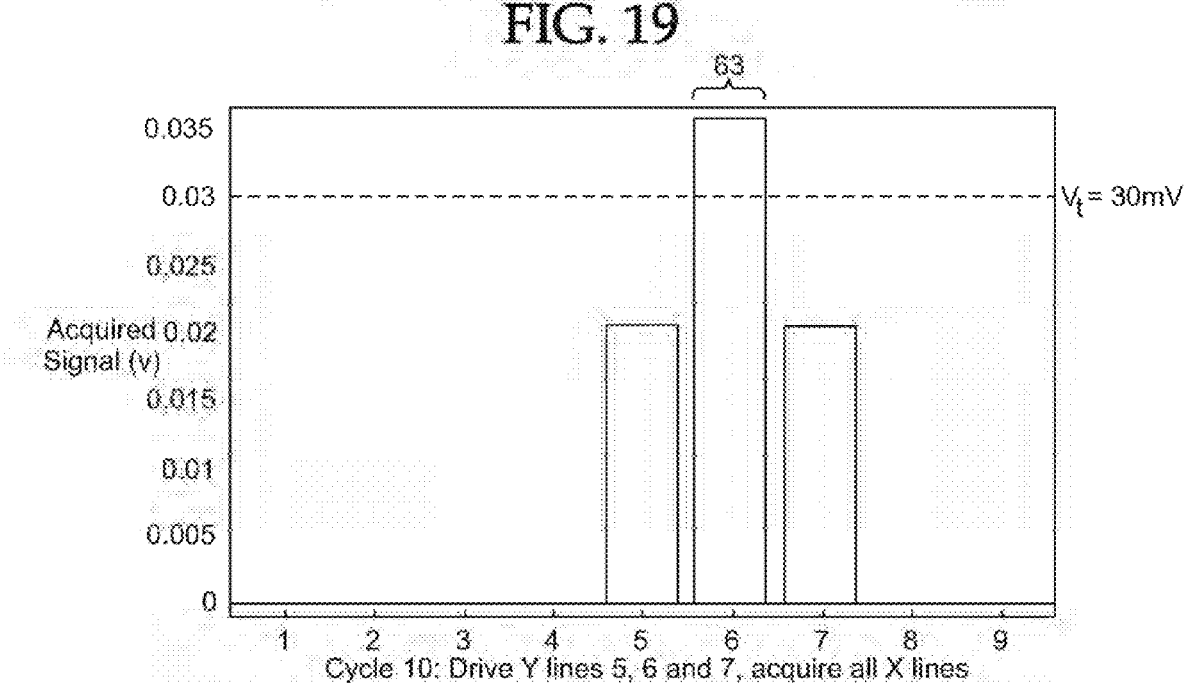
Figure 21:
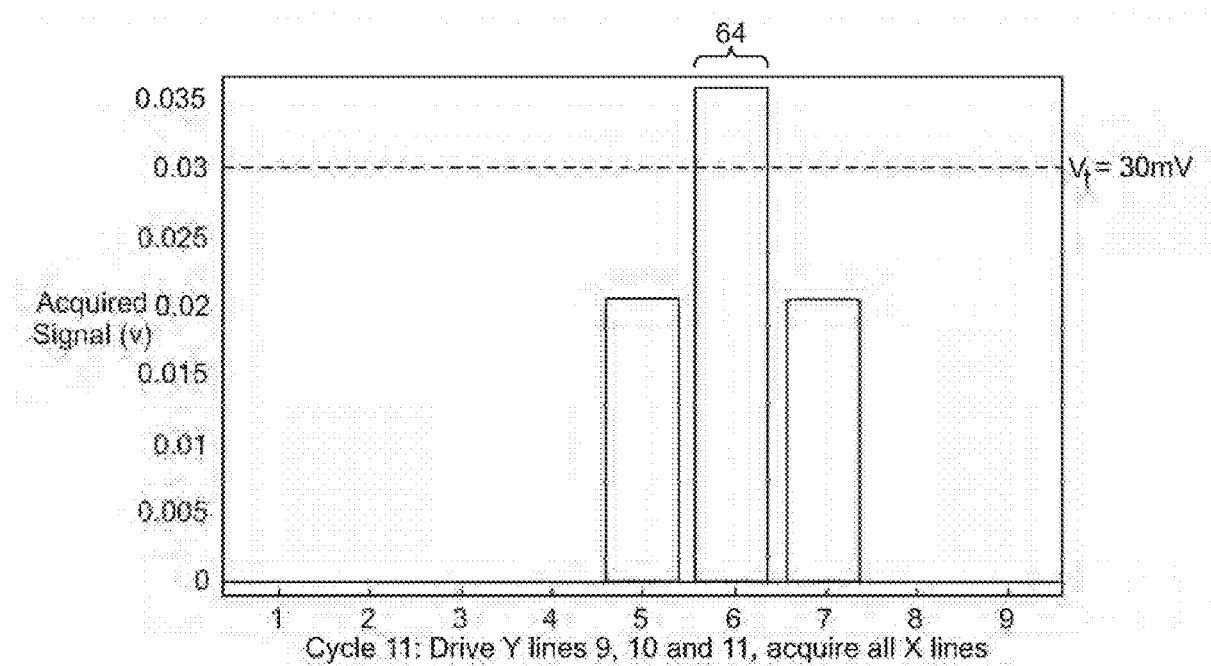

Accordingly, during cycle 10 drive/sense processor 102 instructs drive circuit 40 to drive Y lines 5, 6 and 7, and sense circuits 50 to sense all X lines. The results of this particular sequence of driving and sensing commands are shown in FIG. 20, where it will be seen that a threshold voltage is detected along X line 6 only, which corresponds to touch 63 centered at X line 6. Thus, the unique and precise location of touch 63 is determined by drive/sense processor 102 during cycle 10. The cluster X,Y coordinates of touch 65 are determined by sense/drive processor 102 during cycle 10, and data corresponding to such cluster coordinates are multiplexed for parallel digitization and further processing from drive/sense processor 102 to touchscreen controller 100.

Drive/sense processor 102 again analyzes the sensed data that have been presented to it by sense circuit 50 during preceding cycles 1 through 10, and in cycle 11 drive/sense processor 102 instructs drive circuit 40 to drive Y lines 9, 10 and 11, and sense circuits 50 to sense all X lines. The results of this particular sequence of driving and sensing commands are shown in FIG. 20, where it will be seen that a threshold voltage is detected along Y line 6, which corresponds to single touch 64 disposed along Y lines 5, 6 and 7. The unique and precise location of touch 64 is determined by drive/sense processor 102 during cycle 11. Data corresponding to the cluster X,Y coordinates of touch 64 determined by sense/drive processor 102 during cycle 11 are multiplexed for parallel digitization and further processing from drive/sense processor 102 to touchscreen controller 100.

Note that the various teachings presented herein may be applied to optically transmissive or non-optically-transmissive touchpads disposed, for example, on a printed circuit board, a flex board or other suitable substrate. While the primary use of capacitive touchscreen 90 is believed likely to be in the context of relatively small portable devices, and touchpads or touchscreens therefore, it may also be of value in the context of larger devices, including, for example, keyboards associated with desktop computers or other less portable devices such as exercise equipment, industrial control panels, household appliances, and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand. Furthermore, various embodiments of capacitive touchscreen system 110 and capacitive touchscreen 90 are not limited in scope to drive electrodes disposed in rows and sense electrodes disposed in columns. Instead, rows and columns are interchangeable in respect of sense and drive electrodes. Various embodiments various embodiment of capacitive touchscreen system 110 and capacitive touchscreen 90 are also capable of operating in conjunction with a stylus or other touch device, such that stylus or other touch device touches on touchscreen 90 are detected. System 110 and touchscreen 90 may further be configured to permit the detection of finger touches, stylus touches, and touches made by other types of touch devices known in the art.

In an alternative embodiment, and referring now to FIG. 5, first and second multiplexers 72 and 74 can be configured to receive two inputs each, and to provide one output each. That is, first multiplexer 72 can be configured to receive one input each from drive circuit 40 and sense circuit 50, and to provide one output to the second plurality of electrically conductive traces, while second multiplexer 74 can be configured to receive one input each from drive circuit 40 and sense circuit 50, and to provide one output to the first plurality of electrically conductive traces. In such an embodiment, first and second multiplexers 72 and 74, drive circuit 40 and sense circuit 50 operate under the control of drive/sense processor 102.

Note further that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

I claim:

1. A capacitive touchscreen system comprising,
    a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or other touch devices brought into proximity thereto;
    a first multiplexer connected to both the first plurality of electrically conductive traces and to the second plurality of electrically conductive traces for selecting either the first plurality of electrically conductive traces or the second plurality of electrically conductive traces;
    a second multiplexer connected to both the first plurality of electrically conductive traces and to the second plurality of electrically conductive traces for selecting either the first plurality of electrically conductive traces or the second plurality of electrically conductive traces;
    a plurality of sense circuits operably connected to the first multiplexer, one each of such sense circuits being operably and selectably connectable to a corresponding one of the first plurality of traces or second plurality of traces under the control of a drive/sense processor operably connected thereto, each sense circuit comprising a charge integrator circuit operably connected to a corresponding comparator, and
    a drive circuit operably connected to the second multiplexer and configured to drive at least some of the first plurality of traces or second plurality of traces therethrough;
    wherein the drive/sense processor operably is connected to the first and second multiplexers, the plurality of sense circuits and the drive circuit, the drive/sense processor being configured to control the operation of the plurality of sense circuits to sense at least some of the mutual capacitances through the first or second pluralities of traces, the sense circuits, and the first multiplexer, and to control the operation of the drive circuit to drive at least some of the first or second pluralities of traces through the second multiplexer, the drive circuit and the first and second multiplexers being controlled by the drive/sense processor such that when the mutual capacitances are being sensed by the sense circuits through the first plurality of traces the drive circuit is driving the second plurality of traces, and further such that when the mutual capacitances are being sensed by the sense circuits through the second plurality of traces the drive circuit is driving the first plurality of traces.

2. The capacitive touchscreen system of claim 1, wherein each charge integrator circuit comprises an operational amplifier and a capacitor operably connected to a negative input and an output of the operational amplifier.

3. The capacitive touchscreen system of claim 2, wherein the capacitor is a sample-and-hold capacitor.

4. The capacitive touchscreen system of claim 1, wherein the drive/sense processor is configured to control the drive circuit such that the traces of the first or second pluralities of electrically conductive traces are driven substantially simultaneously.

5. The capacitive touchscreen system of claim 1, wherein the drive/sense processor is configured to control the plurality of sense circuits such that the traces of the first or second pluralities of electrically conductive traces are sensed substantially simultaneously.

6. The capacitive touchscreen system of claim 1, wherein the comparators in the plurality of sense circuits are configured to detect voltages associated with their corresponding mutual capacitances at respective predetermined threshold voltages.

7. The capacitive touchscreen system of claim 1, wherein at least some of the comparators in the plurality of sense circuits are configured to detect voltages associated with their corresponding mutual capacitances at predetermined high and low voltage thresholds.

8. The capacitive touchscreen system of claim 1, wherein the drive/sense processor is further configured to control the plurality of sense circuits to detect the locations of multiple simultaneous or near-simultaneous touches on the touchscreen.

9. The capacitive touchscreen system of claim 1, wherein the drive/sense processor is further configured to control driving selected ones of the first and second pluralities of traces on the basis of the locations of touches that have already been detected.

10. The capacitive touchscreen system of claim 9, wherein the detection of locations of multiple simultaneous or near-simultaneous touches on the touchscreen is carried out using comparators detecting voltages associated with the mutual capacitances corresponding thereto.

11. The capacitive touchscreen system of claim 1, wherein the drive/sense processor is further configured to control sensing selected ones of the first and second pluralities of traces on the basis of the locations of touches that have already been detected.

12. The capacitive touchscreen system of claim 1, wherein the drive/sense processor is further configured to generate tags associated with the locations of detected touches.

13. The capacitive touchscreen system of claim 1, wherein the drive/sense processor is further configured to generate tags associated with the magnitudes of detected touches.

14. The capacitive touchscreen system of claim 1, wherein the angle is about 90 degrees.

15. The capacitive touchscreen system of claim 1, wherein the first and second pluralities of electrically conductive traces are disposed in substantially parallel but vertically-offset first and second planes, respectively.

16. The capacitive touchscreen system of claim 1, wherein the first and second pluralities of electrically conductive traces are disposed in substantially the same plane.

17. The capacitive touchscreen system of claim 1, wherein the first and second pluralities of electrically conductive traces are disposed on a substrate comprising an electrically insulative material.

18. The capacitive touchscreen system of claim 17, wherein the substrate is substantially optically transparent.

19. The capacitive touchscreen system of claim 1, wherein the drive and sense circuits are incorporated into an integrated circuit.

20. The capacitive touchscreen system of claim 1, wherein the touchscreen system is incorporated into or forms a portion of an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device and a household appliance.

21. A capacitive touchscreen system, comprising:
a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or other touch devices brought into proximity thereto;
a first multiplexer connected to both the first plurality of electrically conductive traces and to the second plurality of electrically conductive traces for selecting either the first plurality of electrically conductive traces or the second plurality of electrically conductive traces;
a second multiplexer connected to both the first plurality of electrically conductive traces and to the second plurality of electrically conductive traces for selecting either the first plurality of electrically conductive traces or the second plurality of electrically conductive traces;
a plurality of sense circuits operably connected to the first multiplexer and to the second multiplexer, one each of such sense circuits being operably and selectably connectable to a corresponding one of the first or second pluralities of traces under the control of a drive/sense processor operably connected thereto, each sense circuit comprising a charge integrator circuit operably connected to a corresponding comparator, and
a drive circuit operably connected to the first and second multiplexers and configured to drive at least some of the first plurality of traces or second plurality of traces therethrough;
wherein the drive/sense processor operably is connected to the first and second multiplexers, the plurality of sense circuits and the drive circuit, the drive/sense processor being configured to control the operation of the plurality of sense circuits to sense at least some of the mutual capacitances through the first or second pluralities of traces, the sense circuits, and the first or second multiplexers, and to control the operation of the drive circuit to drive at least some of the first or second pluralities of traces through the first or second multiplexers, the drive circuit and the first and second multiplexers being controlled by the drive/sense processor such that when the mutual capacitances are being sensed by the sense circuits through the first plurality of traces the drive circuit is driving the second plurality of traces, and further such that when the mutual capacitances are being sensed by the sense circuits through the second plurality of traces the drive circuit is driving the first plurality of traces.

22. The capacitive touchscreen system of claim 21, wherein each charge integrator circuit comprises an operational amplifier and a capacitor operably connected to a negative input and an output of the operational amplifier.

23. The capacitive touchscreen system of claim 22, wherein the capacitor is a sample-and-hold capacitor.

24. The capacitive touchscreen system of claim 21, wherein the drive/sense processor is configured to control the drive circuit such that the traces of the first or second pluralities of electrically conductive traces are driven substantially simultaneously.

25. The capacitive touchscreen system of claim 21, wherein the drive/sense processor is configured to control the plurality of sense circuits such that the traces of the first or second pluralities of electrically conductive traces are sensed substantially simultaneously.

26. The capacitive touchscreen system of claim 21, wherein the drive and sense circuits are incorporated into an integrated circuit.

27. The capacitive touchscreen system of claim 21, wherein the touchscreen system is incorporated into or forms a portion of an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device and a household appliance.

28. A method of detecting touches on a capacitive touchscreen system comprising a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or other touch devices brought into proximity thereto, a first multiplexer connected to both the first plurality of electrically conductive traces and to the second plurality of electrically conductive traces for selecting either the first plurality of electrically conductive traces or the second plurality of electrically conductive traces, a second multiplexer connected to both the first plurality of electrically conductive traces and to the second plurality of electrically conductive traces for selecting either the first plurality of electrically conductive traces or the second plurality of electrically conductive traces, a plurality of sense circuits operably connected to the first multiplexer, one each of such sense circuits being operably and selectably connectable to a corresponding one of the first plurality of traces or second plurality of traces under the control of a drive/sense processor operably connected thereto, each sense circuit comprising a charge integrator circuit operably connected to a corresponding comparator, and a drive circuit operably connected to the second multiplexer and configured to drive at least some of the first plurality of traces or second plurality of traces therethrough, wherein the drive/sense processor operably is connected to the first and second multiplexers, the plurality of sense circuits and the drive circuit, the drive/sense processor being configured to control the operation of the plurality of sense circuits to sense at least some of the mutual capacitances through the first or second pluralities of traces, the sense circuits, and the first multiplexer, and to control the operation of the drive circuit to drive at least some of the first or second pluralities of traces through the second multiplexer, the drive circuit and the first and second multiplexers being controlled by the drive/sense processor such that when the mutual capacitances are being sensed by the sense circuits through the first plurality of traces the drive circuit is driving the second plurality of traces, and further such that when the mutual capacitances are being sensed by the sense circuits through the second plurality of traces the drive circuit is driving the first plurality of traces, the method comprising:
  (a) driving the first plurality of electrically conductive traces through the drive circuit;
  (b) sensing the mutual capacitances through the second plurality of electrically conductive traces and the sense circuits;
  (c) driving the second plurality of electrically conductive traces through the drive circuit;
  (d) sensing the mutual capacitances through the first plurality of electrically conductive traces and the sense circuits, and
  (e) detecting the locations of one or more touches on the touchscreen on the basis of sensed mutual capacitances exceeding predetermined voltage thresholds.

29. The method of claim 28, further comprising driving substantially simultaneously at least some of the first or second pluralities of electrically conductive traces with the drive circuit.

30. The method of claim 28, further comprising sensing substantially simultaneously at least some of the mutual capacitances through the first or second pluralities of electrically conductive traces with the sense circuits.

31. The method of claim 28, wherein sensing comprises detecting voltages associated with the mutual capacitances that exceed predetermined threshold voltages.

32. The method of claim 28, further comprising detecting the locations of multiple simultaneous or near-simultaneous touches on the touchscreen through comparators in the sense circuits detecting voltages associated with the mutual capacitances corresponding thereto that exceed predetermined threshold voltages.

33. The method of claim 28, further comprising driving selected ones of the first or second pluralities of traces through the drive circuit on the basis of the locations of touches that have already been detected.

34. The method of claim 28, further comprising controlling sensing selected ones of the first and second pluralities of traces with the sense circuits on the basis of locations of touches that have already been detected.

35. The method of claim 28, further comprising generating tags associated with the locations of detected touches.

36. The method of claim 28, further comprising generating tags associated with the magnitudes of detected touches.

37. A method of detecting touches on a capacitive touchscreen system comprising a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or other touch devices brought into proximity thereto, a first multiplexer connected to both the first plurality of electrically conductive traces and to the second plurality of electrically conductive traces for selecting either the first plurality of electrically conductive traces or the second plurality of electrically conductive traces, a second multiplexer connected to both the first plurality of electrically conductive traces and to the second plurality of electrically conductive traces for selecting either the first plurality of electrically conductive traces or the second plurality of electrically conductive traces, a plurality of sense circuits operably connected to the first multiplexer and to the second multiplexer, one each of such sense circuits being operably and selectably connectable to a corresponding one of the first plurality of traces or second plurality of traces under the control of a drive/sense processor operably connected thereto, each sense circuit comprising a charge integrator circuit operably connected to a corresponding comparator, and a drive circuit operably connected to the first and second multiplexers and configured to drive at least some of the first plurality of traces or second plurality of traces through the first or second multiplexers, wherein the drive/sense processor operably is connected to the first and second multiplexers, the plurality of sense circuits and the drive circuit, the drive/sense processor being configured to control the operation of the plurality of sense circuits to sense at least some of the mutual capacitances through the first or second pluralities of traces, the sense circuits, and the first or second multiplexers, and to control the operation of the drive circuit to drive at least some of the first or second pluralities of traces through the first or second multiplexers, the drive circuit and the first and second multiplexers being controlled by the drive/sense processor such that when the mutual capacitances are being sensed by the sense circuits through the first plurality of traces the drive circuit is driving the second plurality of traces, and further such that when the mutual capacitances are being sensed by the sense circuits through the second plurality of traces the drive circuit is driving the first plurality of traces, the method comprising:

(a) driving the first plurality of electrically conductive traces through the drive circuit;

(b) sensing the mutual capacitances through the second plurality of electrically conductive traces and the sense circuits;

(c) driving the second plurality of electrically conductive traces through the drive circuit;

(d) sensing the mutual capacitances through the first plurality of electrically conductive traces and the sense circuits, and (e) detecting the locations of one or more touches on the touchscreen on the basis of sensed mutual capacitances exceeding predetermined voltage thresholds.

38. The method of claim 37, further comprising driving substantially simultaneously at least some of the first or second pluralities of electrically conductive traces with the drive circuit.

39. The method of claim 37, further comprising sensing substantially simultaneously at least some of the mutual capacitances through the first or second pluralities of electrically conductive traces with the sense circuits.

40. The method of claim 37, wherein sensing comprises detecting voltages associated with the mutual capacitances that exceed predetermined threshold voltages.

41. The method of claim 37, further comprising detecting the locations of multiple simultaneous or near-simultaneous touches on the touchscreen through comparators in the sense circuits detecting voltages associated with the mutual capacitances corresponding thereto that exceed predetermined threshold voltages.

42. The method of claim 37, further comprising driving selected ones of the first or second pluralities of traces through the drive circuit on the basis of the locations of touches that have already been detected.

43. The method of claim 37, further comprising controlling sensing selected ones of the first and second pluralities of traces with the sense circuits on the basis of locations of touches that have already been detected.

44. The method of claim 37, further comprising generating tags associated with the locations of detected touches.

45. The method of claim 37, further comprising generating tags associated with the magnitudes of detected touches.

* * * * *